United States Patent
Sasaki et al.

(10) Patent No.: US 9,652,858 B2
(45) Date of Patent: May 16, 2017

(54) IMAGE PROCESSING APPARATUS, IMAGE PROCESSING METHOD, AND IMAGE PROCESSING SYSTEM

(71) Applicant: FUJI XEROX CO., LTD., Tokyo (JP)

(72) Inventors: Makoto Sasaki, Kanagawa (JP);
Kosuke Maruyama, Kanagawa (JP);
Takayuki Yamamoto, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 198 days.

(21) Appl. No.: 14/539,367

(22) Filed: Nov. 12, 2014

(65) Prior Publication Data

US 2015/0347863 A1 Dec. 3, 2015

(30) Foreign Application Priority Data

May 30, 2014 (JP) ................................ 2014-113460

(51) Int. Cl.
*G06K 9/34* (2006.01)
*G06T 7/20* (2017.01)
(Continued)

(52) U.S. Cl.
CPC ............ *G06T 7/20* (2013.01); *G06K 9/00228* (2013.01); *G06K 9/2081* (2013.01); *G06T 7/11* (2017.01);
(Continued)

(58) Field of Classification Search
None
See application file for complete search history.

(56) References Cited

U.S. PATENT DOCUMENTS 6,973,212 B2 * 12/2005 Boykov ................. G06K 9/342
382/173
7,536,050 B2 * 5/2009 Boykov ................. G06K 9/342
382/171
(Continued)

FOREIGN PATENT DOCUMENTS

JP 2013029930 A 2/2013

OTHER PUBLICATIONS

"Grow-Cut"—Interactive Multi-Label—N-D—Automata., V. Vazhnevets et al., Moscow, Russia, 2005, pp. 1-7.*
(Continued)

*Primary Examiner* — Jayesh A Patel
(74) *Attorney, Agent, or Firm* — Oliff PLC

(57) ABSTRACT

Provided is an image processing apparatus including an image information acquiring unit that acquires image information of an image, a position information acquiring unit that acquires position information of a containing region input by a user so as to contain a designated region that is a specific image region in the image, a first representative position setting unit that sets a first representative position that is a representative position of the designated region based on the position information of the containing region, a second representative position setting unit that sets a second representative position that is a representative position of a region-outside-designated-region that is a region outside the designated region, and a region detection unit that detects the designated region based on the first representative position and the second representative position.

18 Claims, 24 Drawing Sheets

(51) Int. Cl.
*G06K 9/00* (2006.01)
*G06K 9/20* (2006.01)
*G06T 7/11* (2017.01)

(52) U.S. Cl.
CPC ............... *G06T 2207/20101* (2013.01); *G06T 2207/20104* (2013.01)

(56) References Cited

U.S. PATENT DOCUMENTS

| | | |
|---|---|---|
| 7,590,268 B1 | 9/2009 | Skirko |
| 8,610,712 B2* | 12/2013 | Cohen ..................... G06T 7/162 345/419 |
| 2010/0053342 A1 | 3/2010 | Hwang et al. |
| 2012/0263437 A1* | 10/2012 | Barcons-Palau ... G06K 9/00335 386/241 |
| 2013/0009869 A1* | 1/2013 | Wilensky ............ G06F 3/04845 345/156 |
| 2013/0222313 A1 | 8/2013 | Nakamura et al. |
| 2013/0335340 A1* | 12/2013 | Smith ................ G06Q 30/0643 345/173 |

OTHER PUBLICATIONS

Mar. 30, 2016 Search Report issued in Australian Patent Application No. 2014280985.

* cited by examiner

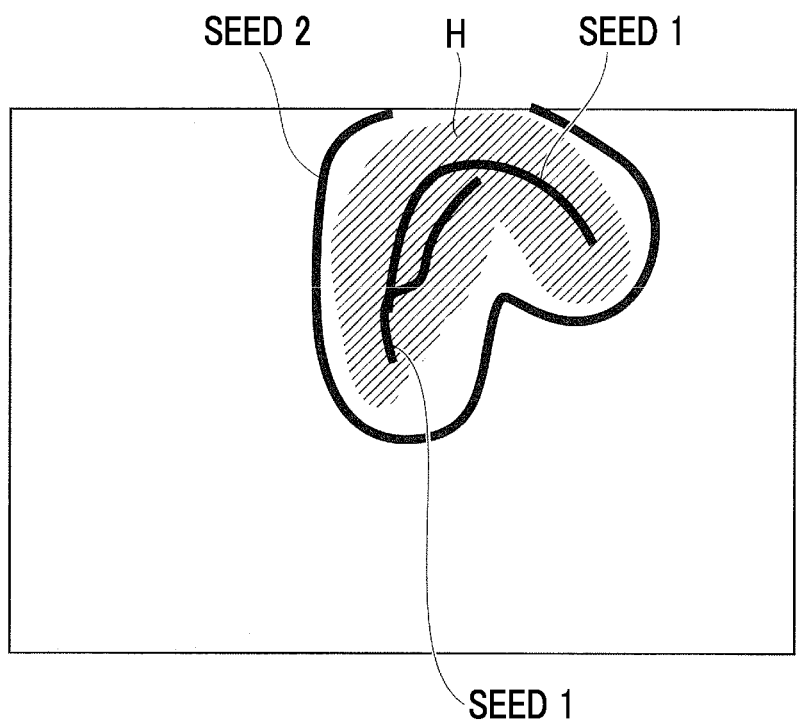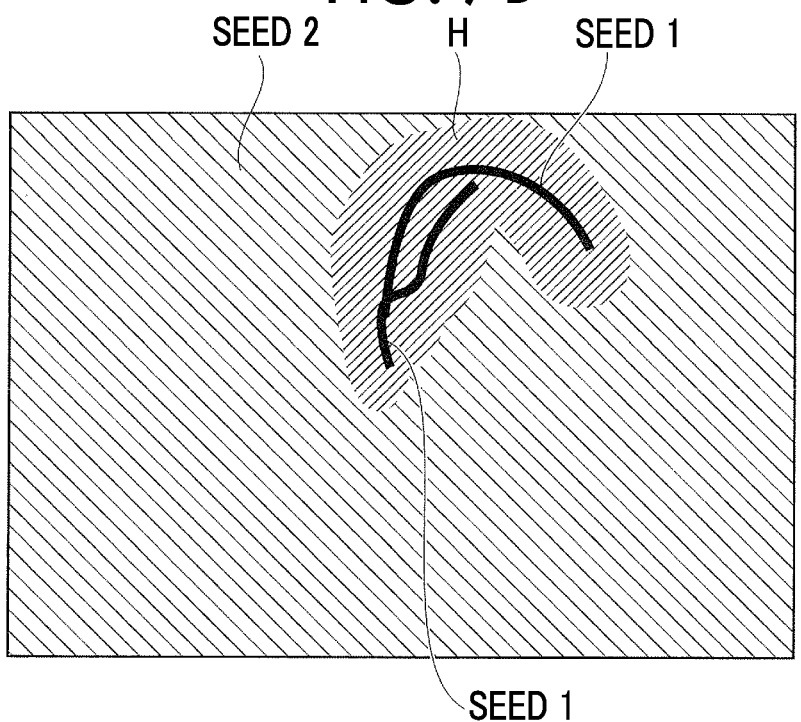

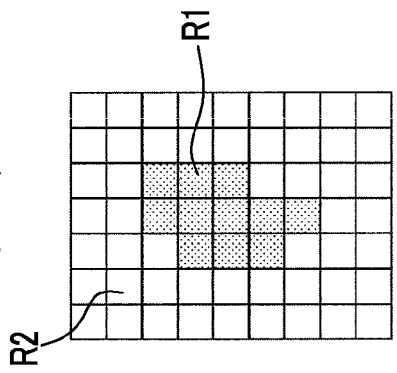
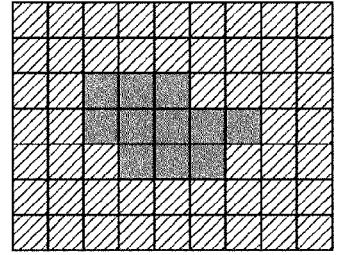
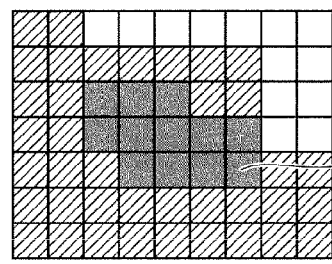
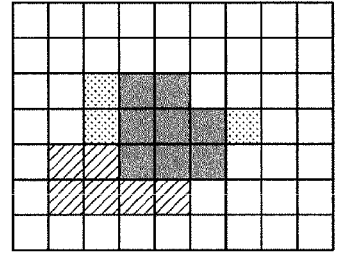
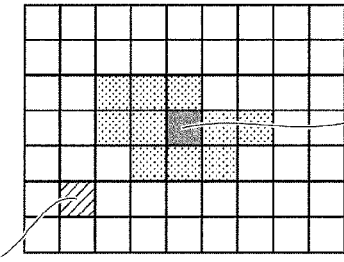

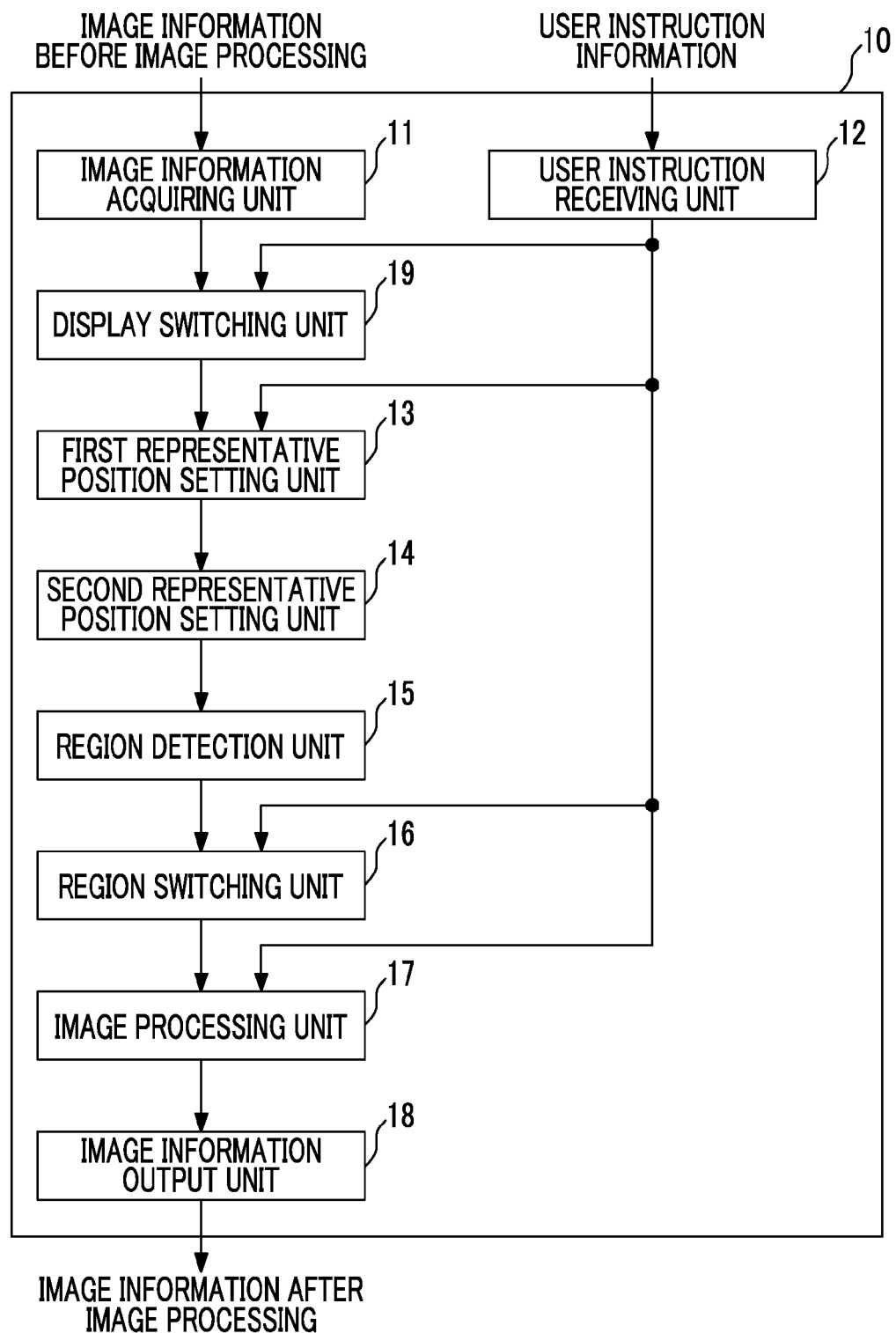

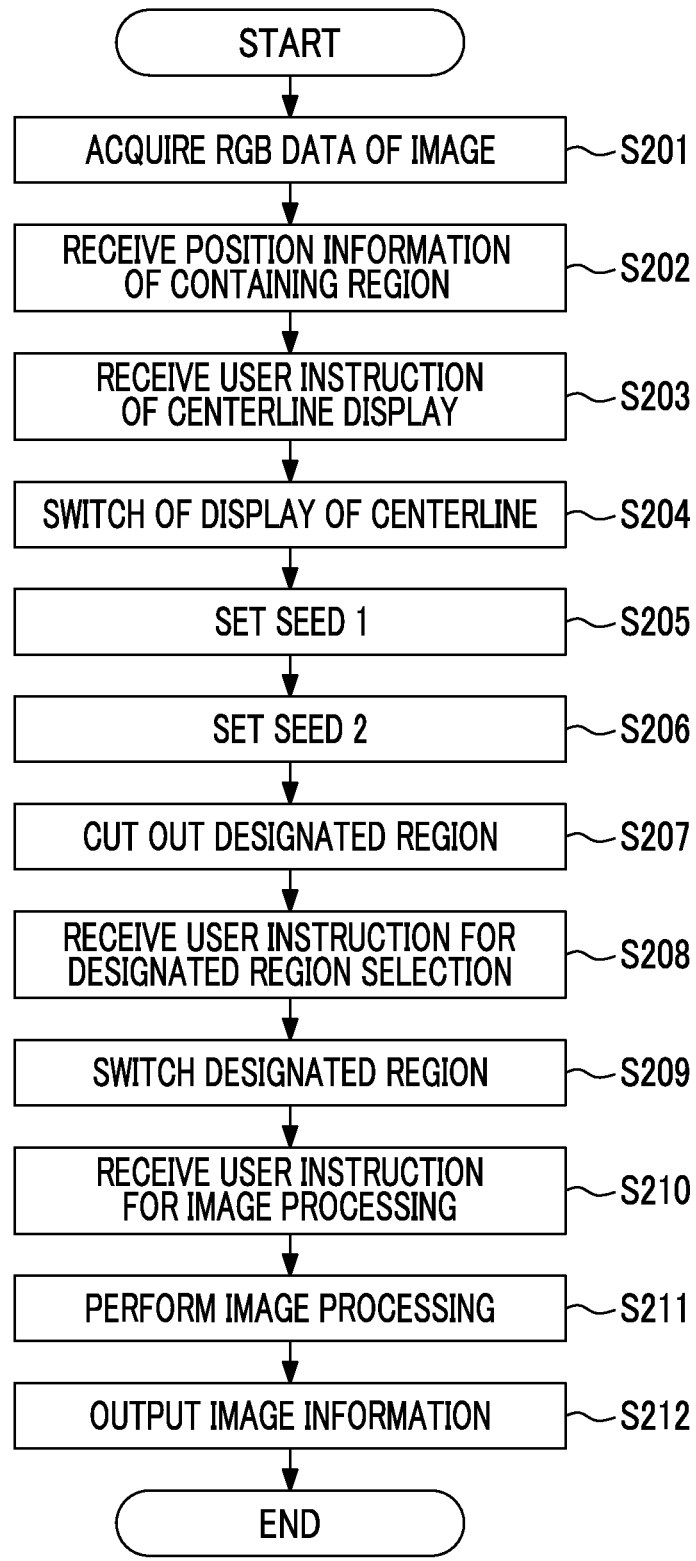

IMAGE PROCESSING APPARATUS, IMAGE PROCESSING METHOD, AND IMAGE PROCESSING SYSTEM

CROSS-REFERENCE TO RELATED APPLICATIONS

This application is based on and claims priority under 35 USC 119 from Japanese Patent Application No. 2014-113460 filed May 30, 2014.

BACKGROUND

Technical Field

The present invention relates to an image processing apparatus, an image processing method, and an image processing system.

SUMMARY

According to an aspect of the invention, there is provided an image processing apparatus including:

an image information acquiring unit that acquires image information of an image;

a position information acquiring unit that acquires position information of a containing region input by a user so as to contain a designated region that is a specific image region in the image;

a first representative position setting unit that sets a first representative position that is a representative position of the designated region based on the position information of the containing region;

a second representative position setting unit that sets a second representative position that is a representative position of a region-outside-designated-region that is a region outside the designated region; and a region detection unit that detects the designated region based on the first representative position and the second representative position.

BRIEF DESCRIPTION OF THE DRAWINGS

Exemplary embodiments of the present invention will be described in detail based on the following figures, wherein:

FIGS. 7A and 7B are diagrams illustrating a case in which a containing region, the seed 1, and a seed 2 are extracted from the image illustrating in FIG. 3;

FIGS. 9A to 9E are diagrams illustrating a state in which an image is divided into two regions when two seeds are assigned using a region extension method;

FIG. 14 is a block diagram illustrating an example of a functional configuration of an image processing apparatus in a second exemplary embodiment of the present invention;

FIG. 16 is a flowchart illustrating an operation of the image processing apparatus in the second exemplary embodiment;

DETAILED DESCRIPTION

Hereinafter, exemplary embodiments of the present invention will be described in detail with reference to the accompanying drawings.

BACKGROUND OF INVENTION

For example, when adjustment of image quality of a color image is performed, the adjustment may be performed on the entire color image or on respective regions of the color image. Elements representing the color image may be generally represented by color components such as RGB, brightness and chromaticity such as L*a*b*, or brightness, hue, and chroma such as HSV. Further, representative examples of control of the image quality may include histogram control of color components, contrast control of brightness, histogram control of the brightness, band control of brightness, hue control, and chroma control. Further, in recent years, the control of image quality indicating visibility, such as Retinex, has been noted. When image quality based on a band of color or brightness is controlled and, particularly, adjustment of the image quality is performed on only a designated region, a process of cutting out this region is required.

Meanwhile, since a range of image processing has spread with the recent spread of information and communication technology (ICT) devices, various approaches for a region cutting-out process and image adjustment are considered. In this case, an advantage of an ICT device represented by a tablet terminal is an intuition characteristic due to a touch panel or the like, and the ICT device is characterized in performing the image processing and image editing with an increase in user interactivity.

In the present exemplary embodiment, cutting-out of a designated region or adjustment of image quality is performed in light of the above situation using an image processing system 1 as will be described below.

Description of Entire Image Processing System

Figure 1:
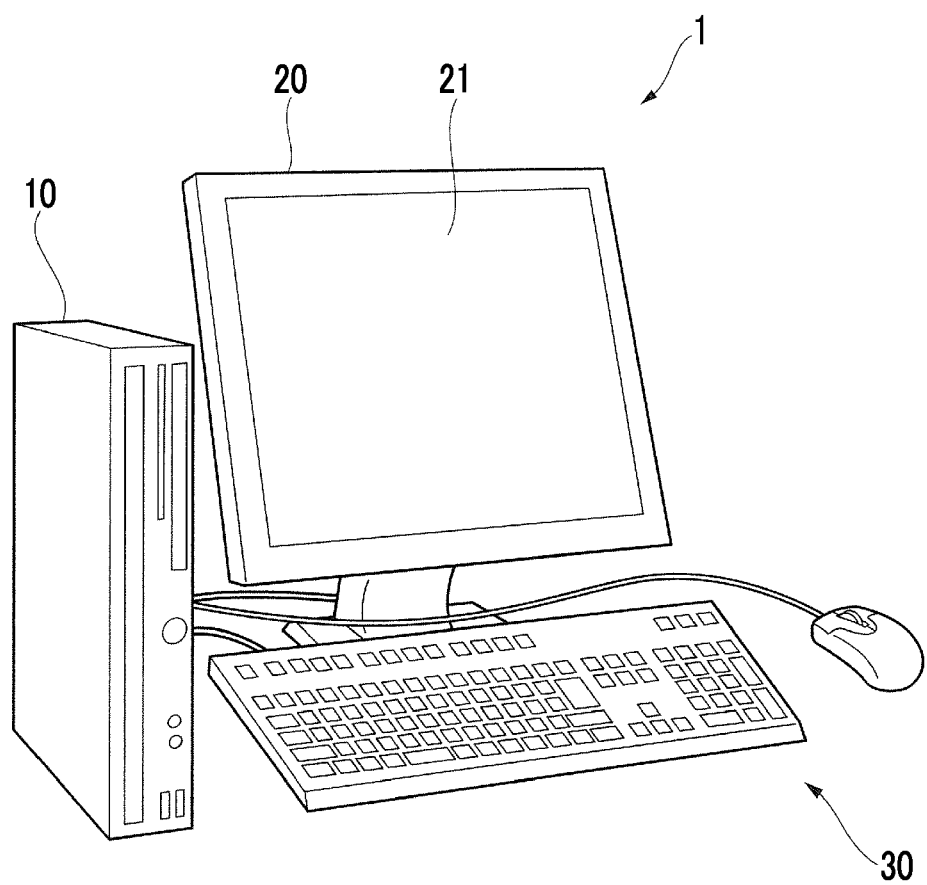
FIG. 1 is a diagram illustrating an example of a configuration of an image processing system in the present exemplary embodiment.

FIG. 1 is a diagram illustrating an example of a configuration of the image processing system 1 in the present exemplary embodiment.

The image processing system 1 of the present exemplary embodiment includes an image processing apparatus 10 that performs image processing on image information of an image displayed on a display device 20, the display device 20 to which image information produced by the image processing apparatus 10 is input and that displays an image based on this image information, and an input device 30 used for a user to input various information to the image processing apparatus 10.

The image processing apparatus 10 is, for example, so-called a general purpose personal computer (PC). Also, the image processing apparatus 10 operates various application software under management of an operating system (OS) so that production of the image information is performed.

The display device 20 displays the image on a display screen 21. The display device 20 includes, for example, a display device having a function of displaying an image using additive color mixing, such as a liquid crystal display for a PC, a liquid crystal television, or a projector. Therefore, a display type in the display device 20 is not limited to a liquid crystal type. Further, in the example illustrated in FIG. 1, the display screen 21 is provided inside the display device 20, but the display screen 21 is, for example, a screen provided outside the display device 20 when a projector, for example, is used as the display device 20.

The input device 30 includes, for example, a keyboard or a mouse. The input device 30 is used for a user to input an instruction to the image processing apparatus 10 to perform start-up or ending of application software for performing image processing or to perform image processing when the image processing is to be performed, which will be described below in detail.

The image processing apparatus 10 and the display device 20 are connected via a digital visual interface (DVI). Further, the image processing apparatus 10 and the display device 20 may be connected via a high-definition multimedia interface (HDMI; registered trademark), DisplayPort, or the like, instead of the DVI.

Further, the image processing apparatus 10 and the input device 30 are connected, for example, via a universal serial bus (USB). Further, the image processing apparatus 10 and the input device 30 may be connected via IEEE1394 or RS-232C, instead of the USB.

In such the image processing system 1, an original image which is an image before image processing is performed is first displayed on the display device 20. Also, when the user inputs an instruction for causing the image processing apparatus 10 to perform image processing using the input device 30, the image processing is performed on image information of the original image by the image processing apparatus 10. A result of this image processing is reflected in the image displayed on the display device 20 and the image after the image processing is redrawn and displayed on the display device 20. In this case, the user may interactively perform the image processing while viewing the display device 20, and may perform an image processing task more intuitively and more easily.

In addition, the image processing system 1 in the present exemplary embodiment is not limited to the aspect of FIG. 1. An example of the image processing system 1 may be a tablet terminal. In this case, the tablet terminal includes a touch panel, and display of an image is performed and an instruction of a user is input by this touch panel. That is, the touch panel functions as the display device 20 and the input device 30. Further, a touch monitor may be similarly used as a device in which the display device 20 and the input device 30 are integrated. This touch monitor uses a touch panel as the display screen 21 of the display device 20. In this case, image information is produced by the image processing apparatus 10, and an image is displayed on the touch monitor based on this image information. Also, the user inputs an instruction to perform image processing, for example, by touching this touch monitor.

Description of Image Processing Apparatus

First Exemplary Embodiment

Next, a first exemplary embodiment of the image processing apparatus 10 will be described.

Figure 2:
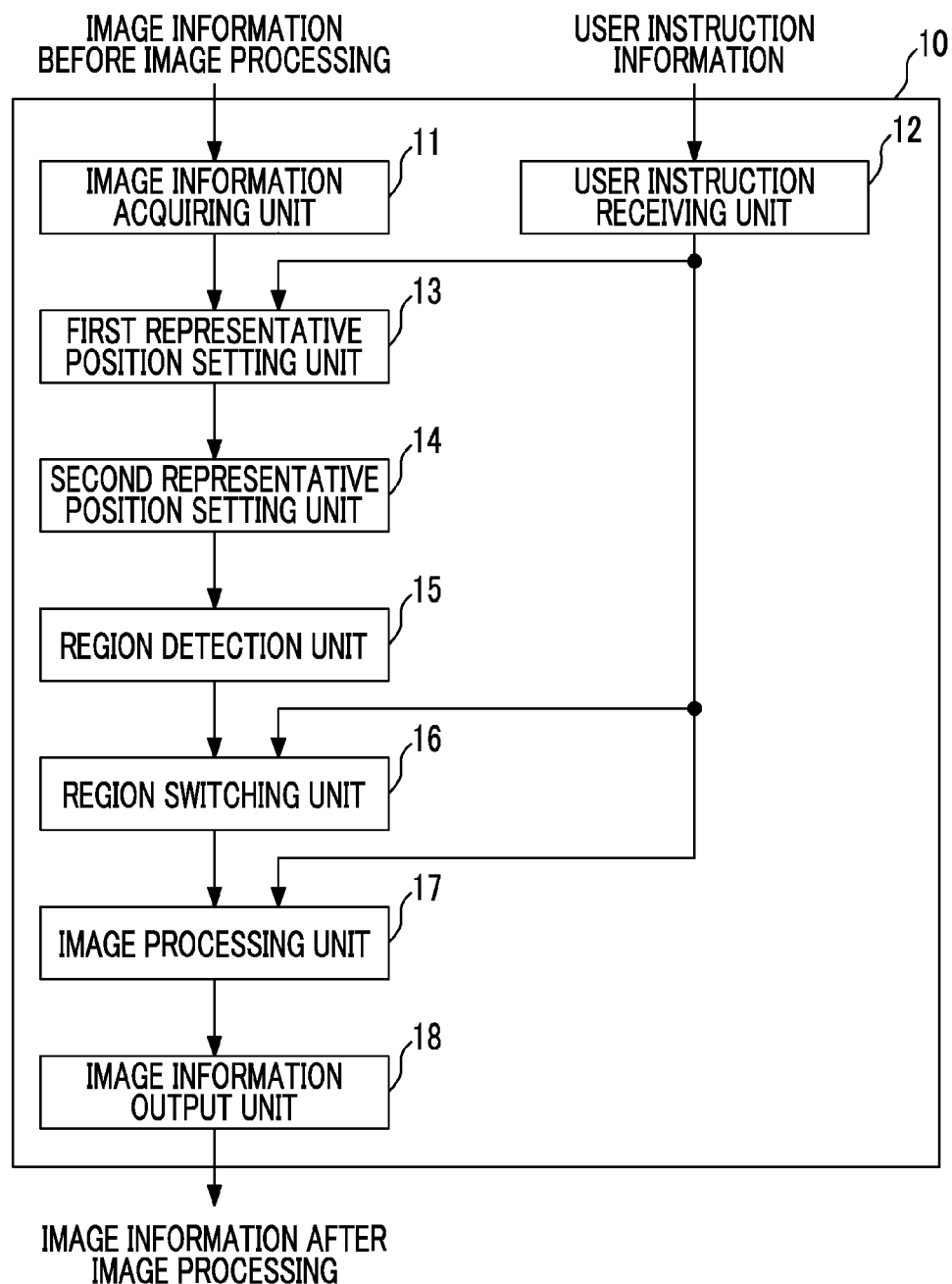
FIG. 2 is a block diagram illustrating an example of a functional configuration of the image processing apparatus in the present exemplary embodiment.

FIG. 2 is a block diagram illustrating an example of a functional configuration of the image processing apparatus 10 in a first exemplary embodiment of the present invention. Further, functions related to the first exemplary embodiment among various functions of the image processing apparatus 10 are selected and illustrated in FIG. 2.

As illustrated, the image processing apparatus 10 of the present exemplary embodiment includes an image information acquiring unit 11, a user instruction receiving unit 12, a first representative position setting unit 13, a second representative position setting unit 14, a region detection unit 15, a region switching unit 16, an image processing unit 17, and an image information output unit 18.

The image information acquiring unit 11 acquires image information of an image to be subjected to image processing. That is, the image information acquiring unit 11 acquires image information before the image processing is performed. This image information is, for example, video data (RGB data) of red, green, and blue (RGB) for performing display in the display device 20.

The user instruction receiving unit 12 is an example of a position information acquiring unit, and receives an instruction of the user regarding image processing input by the input device 30.

Specifically, the user instruction receiving unit 12 receives, as user instruction information, an instruction for designating a designated region as an image region to be subjected to the image processing by the user from an image displayed on the display device 20. More specifically, in the present exemplary embodiment, the user instruction receiving unit 12 acquires position information of a containing region input by a user to contain the designated region that is a specific image region in the image, as user instruction information.

Further, although described below in detail, the user instruction receiving unit 12 receives, as the user instruction information, an instruction to select a region where image processing is to be actually performed from this designated region. Further, the user instruction receiving unit 12 receives, as the user instruction information, an instruction regarding a processing item or a processing amount in which the user performs the image processing on the selected designated region. A more detailed description of content thereof will be described below.

In this exemplary embodiment, a method of performing a task of designating the designated region in a user interactive manner to be described below is adopted.

Figure 3:
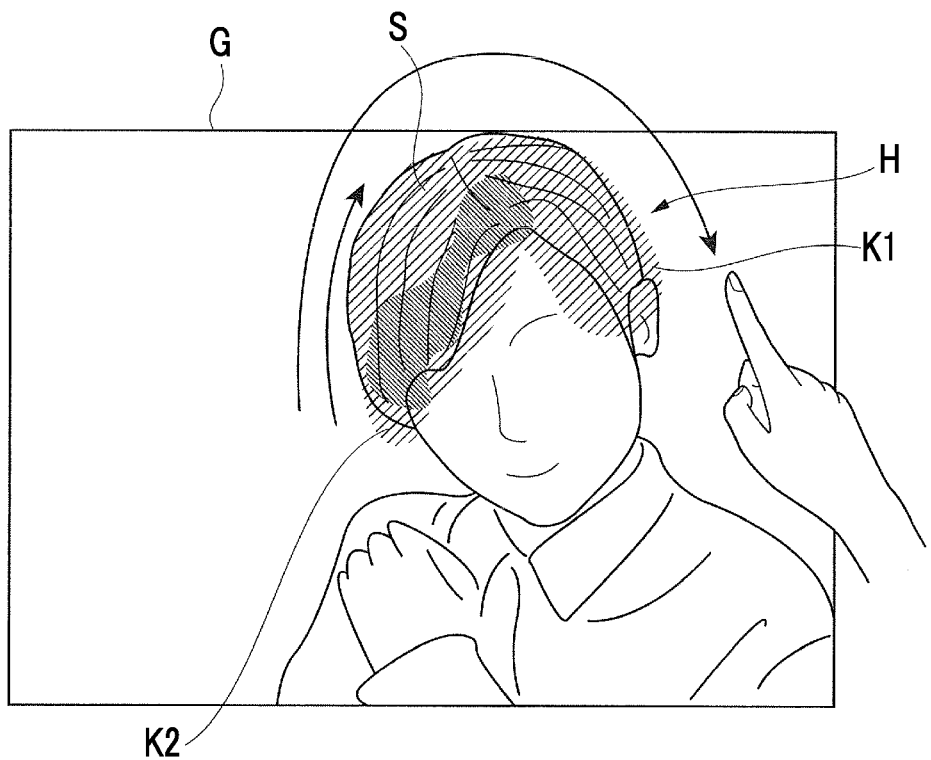
FIG. 3 is a diagram illustrating an example of a method of performing a task of designating a designated region in a user interactive manner.

FIG. 3 is a diagram illustrating the method of performing a task of designating the designated region in a user interactive manner.

Here, a case in which the image displayed on the display screen 21 of the display device 20 is an image G of a photograph including a person captured as a foreground and a background captured behind the person is illustrated. Also, a case in which the user selects a portion of hair of the person who is the foreground as a designated region S is illustrated. Further, a region outside the designated region may be hereinafter referred to as a "region-outside-designated-region".

Also, the user inputs a containing region H containing the designated region S to the image G. Specifically, the user draws a trajectory for the portion of the hair that is the designated region S and a peripheral portion protruding from the portion on the image G to thereby input the containing region H containing the designated region S. In this case, the containing region H is a region that is a combination of the portion of the hair that is the designated region S and a peripheral portion protruding from the portion.

This trajectory may be drawn by the input device 30. For example, when the input device 30 is a mouse, the user manipulates the mouse to drag the image G displayed on the display screen 21 of the display device 20 and draw the locus. Further, when the input device 30 is a touch panel, the user similarly draws a trajectory by tracing and swiping the image G with a finger of the user, the touch pen, or the like.

This trajectory need not be drawn once and may be drawn plural times. That is, the containing region H may be input by the user drawing plural trajectories on the image G.

For example, in FIG. 3, the user draws a trajectory twice to obtain an arc-shaped trajectory K1 drawn in a direction from left to right in FIG. 3 and a trajectory K2 drawn in a curve shape close to a letter "S" in the same direction. Accordingly, the containing region H that contains the designated region S may be input. Further, the trajectories K1 and K2 may be regions that overlap on the image G. In FIG. 3, display in which a region through which the trajectory has passed once without overlap of the twice drawn trajectories is lightly colored is performed, and display in which a region through which the trajectory has passed twice with overlap of the twice drawn trajectories is densely colored is performed.

Further, the trajectory is not limited to being drawn in the same direction, but may be drawn through a reciprocating operation. Further, this trajectory is drawn in a thick line rather than a thin line in order to further facilitate input of the containing region H. This may be realized, for example, using a method of mounting a large brush tool among brush tools used in image processing software or the like for performing image processing.

The first representative position setting unit 13 sets a first representative position that is a representative position of the designated region based on the position information of the containing region.

Further, the second representative position setting unit sets a second representative position that is a representative position of the region-outside-designated-region, which is the region outside the designated region.

Figure 4:
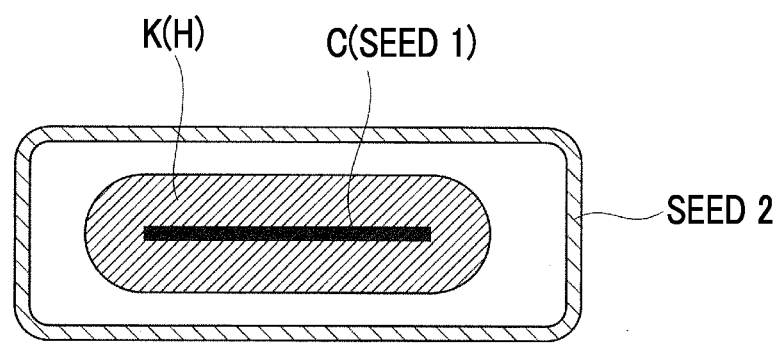
FIG. 4 is a conceptual diagram illustrating an example of a first representative position and a second representative position.

FIG. 4 is a conceptual diagram illustrating an example of the first representative position and the second representative position.

Here, the first representative position, which is a representative position of the designated region, is set as a position of a centerline C of the drawn trajectory K (in this case, the containing region H). In this case, the "centerline" is a line obtained by continuously connecting, in a direction in which the trajectory is drawn, a central portion in a thickness direction (width direction) of the trajectory K.

When the user inputs the trajectory K to designate the designated region, the user performs an operation of drawing the central portion on the image G, and thus, it is reasonable to use the centerline C as a representative position of the trajectory K in terms of psychology of the user. Accordingly, this centerline C is used as the first representative position. Further, the first representative position may be hereinafter referred to as "seed 1," as illustrated in FIG. 4.

Figure 5:
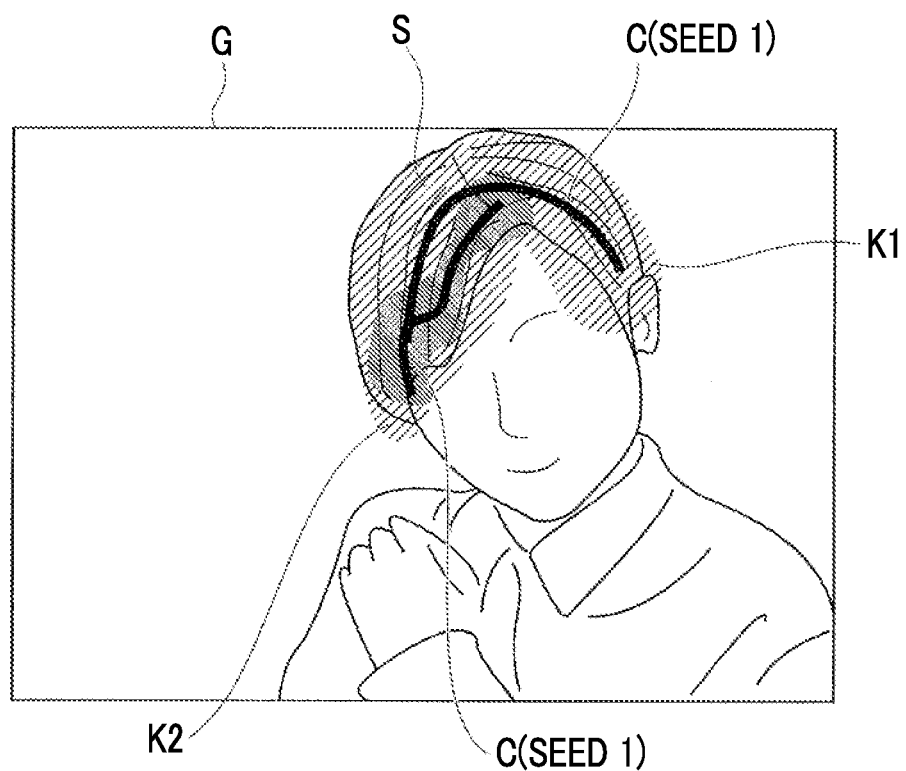
FIG. 5 illustrates a case in which a seed 1 that is the first representative position is shown in an image illustrated in FIG. 3.

FIG. 5 illustrates a case in which the seed 1 that is the first representative position is shown in the image G illustrated in FIG. 3.

As described above, the trajectory K1 and the trajectory K2 are drawn so as to input the containing region H in FIG. 3. Accordingly, in this case, the seed 1 that is a centerline of the trajectory also includes two curves.

Further, since the designated region is not included in a region outside the containing region H, the region-outside-designated-region corresponds to an entire region outside the containing region H. Thus, the second representative position, which is a representative position of the region-outside-designated-region, may be set to be outside the containing region H, but the present invention is not particularly limited.

In FIG. 4, the second representative position is set by a linear region having a substantially constant thickness drawn along and around the containing region H, and as a result, is set as a region in a shape close to a rectangular shape. Further, the second representative position may be hereinafter referred to as "seed 2," as illustrated in FIG. 4.

Figure 6:
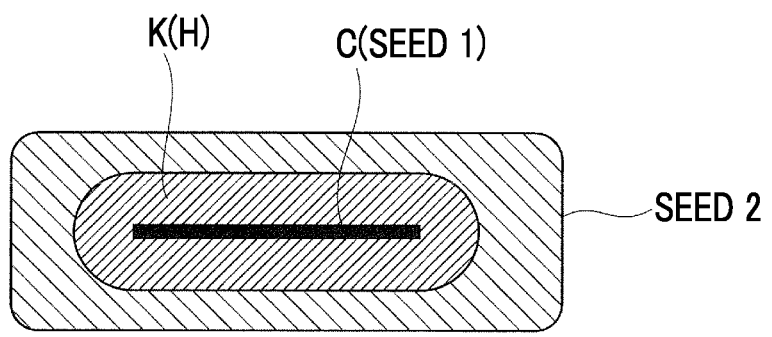
FIG. 6 is a conceptual diagram illustrating another example of the first representative position and the second representative position.

FIG. 6 is a conceptual diagram illustrating another example of the first representative position and the second representative position.

In the example illustrated in FIG. 6, "seed 1" that is the first representative position is the same as that in the case of FIG. 4. On the other hand, "seed 2" that is the second representative position is set as an entire region outside the containing region H.

According to the method of FIGS. 4 and 6, in the present exemplary embodiment, it may be said that the second representative position setting unit 14 sets the seed 2 that is the second representative position as a position of at least a portion outside the containing region H.

FIGS. 7A and 7B are diagrams illustrating a case in which the containing region H, the seed 1, and the seed 2 are extracted from the image G illustrated in FIG. 3.

FIG. 7A illustrates a case in which the seed 1 and the seed 2 are set using the method illustrated in FIG. 4. As illustrated, the seed 1 shown by two curves that are centerlines of the trajectory K1 and the trajectory K2, and the seed 2 shown by one straight line along the containing region H are set.

Further, FIG. 7B illustrates a case in which the seed 1 and the seed 2 are set using the method illustrated in FIG. 6. As illustrated in FIG. 7B, the seed 1 is the same as that in FIG. 7A. On the other hand, the seed 2 is set as an entire region outside the containing region H.

The region detection unit 15 detects the designated region from the first representative position and the second representative position. In practice, the region detection unit 15 performs a process of cutting out the designated region from the image displayed on the display device 20.

The region detection unit 15 may use, for example, a method of regarding the image G as a graph and using a principle of maximum flow minimum cut to perform cutting-out of the designated region.

Figure 8:
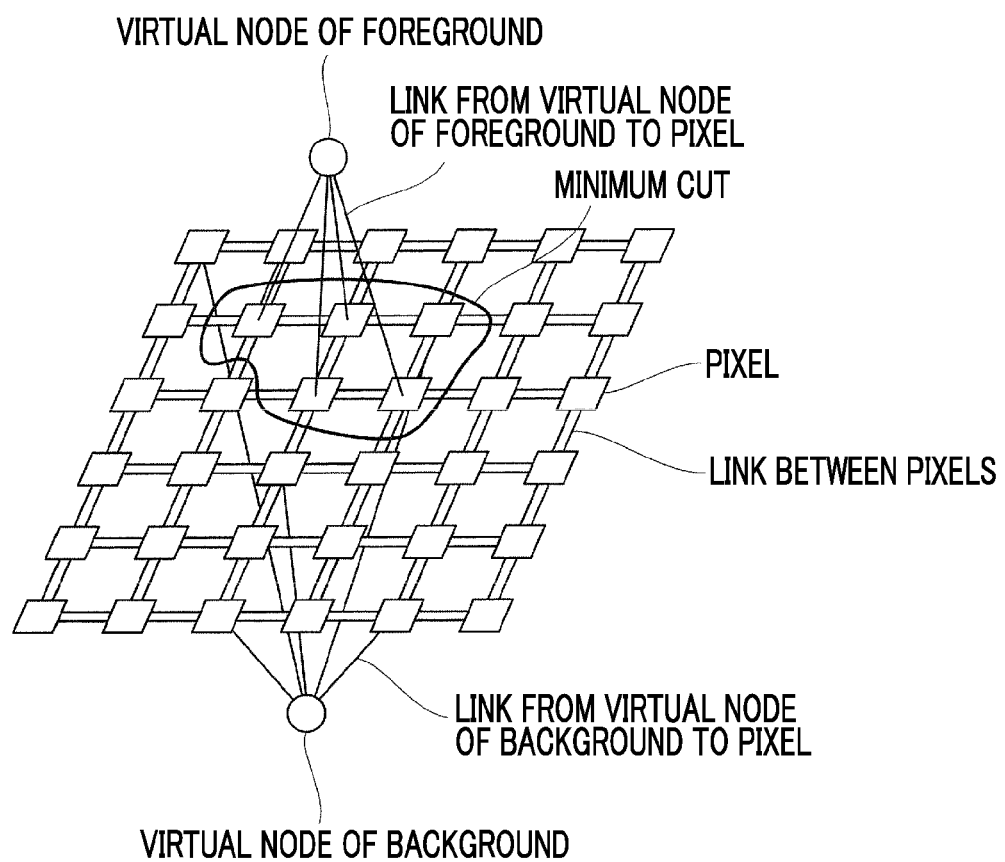
FIG. 8 is a diagram illustrating a principle of maximum flow minimum cut.

According to this principle, a virtual node of a foreground is set to a start point, a virtual node of a background is set as an end point, the virtual node of the foreground and a representative position of a foreground region designated by the user are linked, and a representative position of the background region designated by the user and the endpoint are linked, as illustrated in FIG. 8. Also, when water flows from the start point, a maximum flow amount is calculated. In this principle, a value of the link from the foreground to the start point is regarded as a thickness of a pipe of a water pipe, and a total of cuts of a place that is a bottleneck (in which it is difficult for water to flow) is a maximum flow amount. That is, cutting of a link that is the bottleneck is separation of the foreground and the background (graph cut).

Further, the region detection unit 15 may cut out the designated region using a region extension method in which a task of connecting the pixels when the pixel values are close and not connecting the pixels when the pixel values are not close, based on the closeness of pixel values between a pixel having the seed drawn therein and a peripheral pixel (for example, an Euclidean distance of the RGB value) is repeated to extend the region.

FIGS. 9A to 9E are diagrams illustrating a state in which an image is divided into two regions when two seeds are assigned using a region extension method.

FIG. 9A illustrates an original image of which the designated region is to be cut out. As illustrated, the original image includes a region of 63 (=9×7) pixels including nine pixels in a vertical direction and seven pixels in a horizontal direction, and an image region R1 and an image region R2 are included as illustrated. A pixel value of each of pixels included in the image region R1 and a pixel value of each of pixels included in the image region R2 are close to each other.

Also, the image region R1 is assumed to be cut out as the designated region. Further, in the case, the image region R2 is a region-outside-designated-region.

Further, in order to simplify description, the seed 1 and the seed 2 include single pixels at two places respectively set in the image regions R1 and R2, as illustrated in FIG. 9B.

Also, a region is extended from each seed as a basic point. In this case, the region may be extended according to, for example, closeness to a pixel value of the peripheral pixel in the original image, as described above. In this case, when there is competition between the regions as illustrated in FIG. 9C, corresponding pixels are target pixels to be re-determined and a determination may be made as to which region the pixels belong to, based on a relationship between the pixel value of the target pixel to be re-determined and the value of the peripheral pixel. In this case, a method described in the following document may be used.

V. Vezhnevets and V. Konouchine: "Grow-Cut"—Interactive Multi-label N-D Image Segmentation," Proc. Graphicon. pp 150-156 (2005)

In the example of FIG. 9D, the target pixels to be re-determined are finally determined to be in the region of the seed 2, and as illustrated in FIG. 9E, the images are divided and converged into two regions based on the two seeds.

Figure 10:
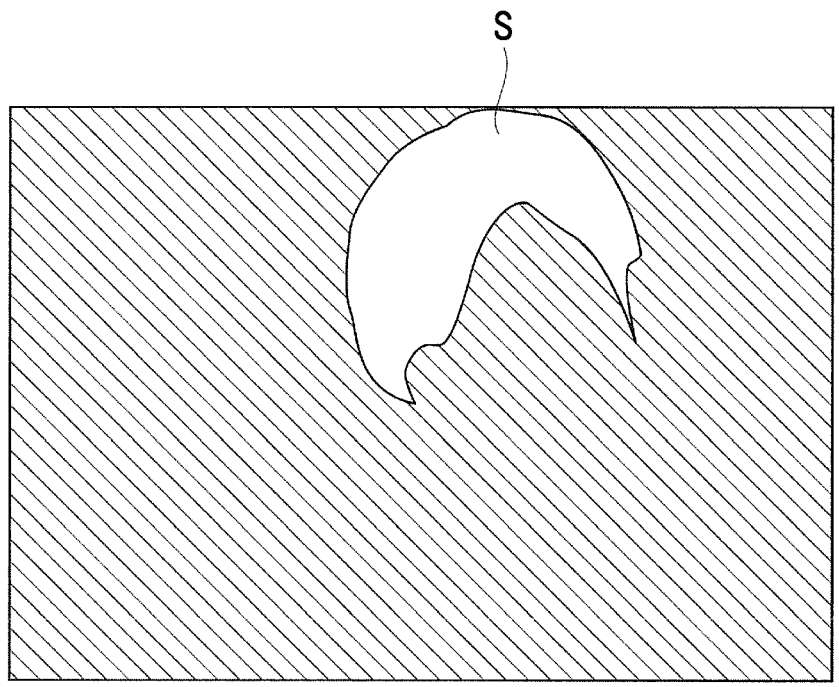
FIG. 10 illustrates a state in which a portion of hair has been cut as a designated region in the image illustrated in FIG. 3.

FIG. 10 illustrates a state in which a portion of hair is cut out as the designated region S from the image G illustrated in FIG. 3.

By adopting the method as describe above, even when the designated region has a complicated shape, the user may cut out the designated region more intuitively and more easily. Further, the user may cut out plural designated regions by repeating, plural times, a task of inputting a containing region that contains the designated region to the image.

Referring back to FIG. 2, when the user cuts out plural designated regions, the region switching unit 16 switches between these designated regions. That is, when there are plural designated regions, the user selects the designated regions desired to be subjected to image adjustment, and the region switching unit 16 switches between the designated regions according to this selection.

Figure 11A:
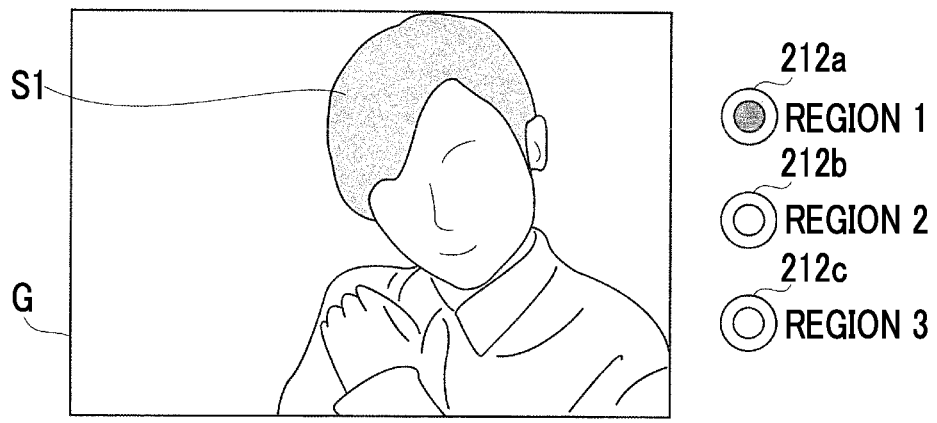
FIGS. 11A to 11C illustrate examples of a screen displayed on a display screen of a display device when a user performs selection of a designated region.
Figure 11B:
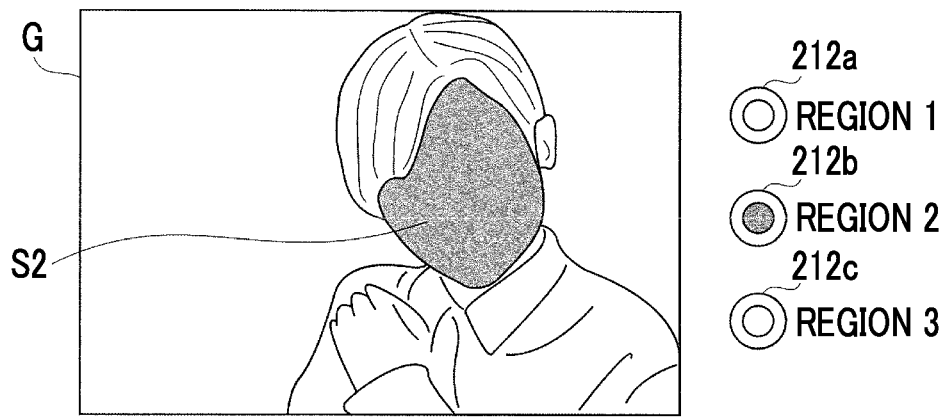
Figure 11C:

FIGS. 11A to 11C illustrate examples of a screen displayed on the display screen 21 of the display device 20 when the user selects the designated region.

In the examples illustrated in FIGS. 11A to 11C, a case in which the user selects a portion of hair of a person who is a foreground of the image G, a portion of a face, and a portion other than the hair and the face as the designated regions is illustrated. That is, in this case, there are three designated regions. Here, the designated region of the portion of the hair is a "first designated region S1," the designated region of the portion of the face is a "second designated region S2," and the designated region of the portion other than the hair and the face is a "third designated region S3."

In the example illustrated in FIGS. 11A to 11C, the image G of which the designated region has been selected is displayed on the left side of the display screen 21, and radio buttons 212a, 212b, and 212c for selecting any one of "region 1," "region 2," and "region 3" are displayed on the right side of the display screen 21. In this case, "region 1" corresponds to the "first designated region S1," "region 2" corresponds to the "second designated region S2," and "region 3" corresponds to the "third designated region S3." Also, when the user selects the radio button 212a, 212b, or 212c using the input device 30, the designated region is switched.

FIG. 11A illustrates a state in which the radio button 212a is selected, in which the "first designated region S1" that is an image region of the portion of the hair is selected as the designated region. Also, when the user selects the radio button 212b, the designated region is switched to the "second designated region S2" that is an image region of the portion of the face, as illustrated in FIG. 11B. Also, when the user selects the radio button 212c, the designated region is switched to the "third designated region S3" that is an image region of the portion other than the hair and the face, as illustrated in FIG. 11C.

In practice, a result of the manipulation illustrated in FIGS. 11A to 11C is acquired by the user instruction receiving unit 12 as the user instruction information, and switching between the designated regions is performed by the region switching unit 16.

The image processing unit 17 actually performs the image processing on the selected designated region.

Figure 12:
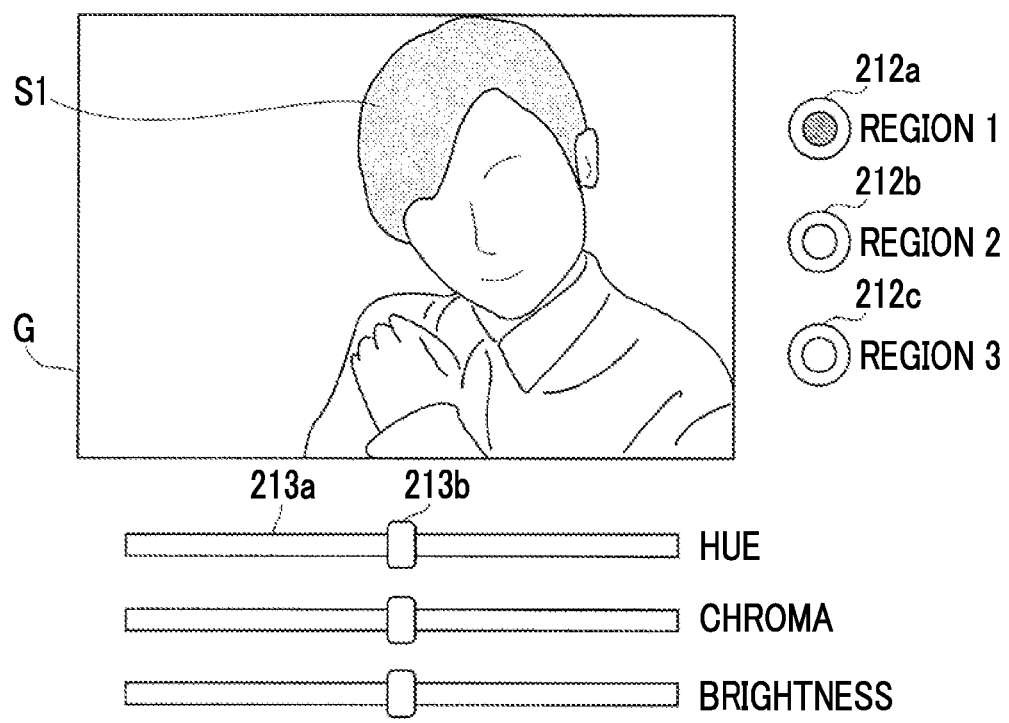
FIG. 12 illustrates an example of a screen displayed on the display screen of the display device when image processing is performed.

FIG. 12 illustrates an example of a screen displayed on the display screen 21 of the display device 20 when the image processing is performed.

Here, an example in which adjustment of hue, chroma, and brightness is performed on the selected designated region is illustrated. In this example, the image G of which the designated region has been selected is displayed on the upper left side of the display screen 21, and the radio buttons 212a, 212b, and 212c for selecting "region 1," "region 2," and "region 3" are displayed on the upper right side of the display screen 21. Here, 212a is selected from among the radio buttons, and the "first designated region S1" that is the image region of the portion of the hair is selected as the designated region. Further, the designated region may be switched by manipulating the radio buttons 212a, 212b, and 212c, as in the case of FIGS. 11A to 11C.

Further, a slide bar 213a and a slider 213b for performing the adjustment of "hue," "chroma," and "brightness" are displayed on the lower side of the display screen 21. The slider 213b may move and slide in right and left directions of FIG. 12 on the slide bar 213a through a manipulation of the input device 30. The slider 213b is located at a center of the slide bar 213a in an initial state, and statuses before adjustment of "hue," "chroma," and "brightness" are indicated in this position.

Also, when the user slides the slider 213b of any one of "hue," "chroma," and "brightness" on the slide bar 213a in the right and left directions of FIG. 12 using the input device 30, the image processing is performed on the selected designated region, and the image G displayed on the display screen 21 is correspondingly changed. In this case, when the user slides the slider 213b in the right direction in the drawing, the image processing is performed to increase a corresponding one of "hue," "chroma," and "brightness." On the other hand, when the user slides the slider 213b in the left direction in the drawing, the image processing is performed to decrease a corresponding one of "hue," "chroma," and "brightness."

Referring back to FIG. 2, the image information output unit 18 outputs image information after the image processing is performed as described above. The image information after the image processing is performed is sent to the display device 20. Also, the image is displayed on the display device 20 based on this image information.

Figure 13:
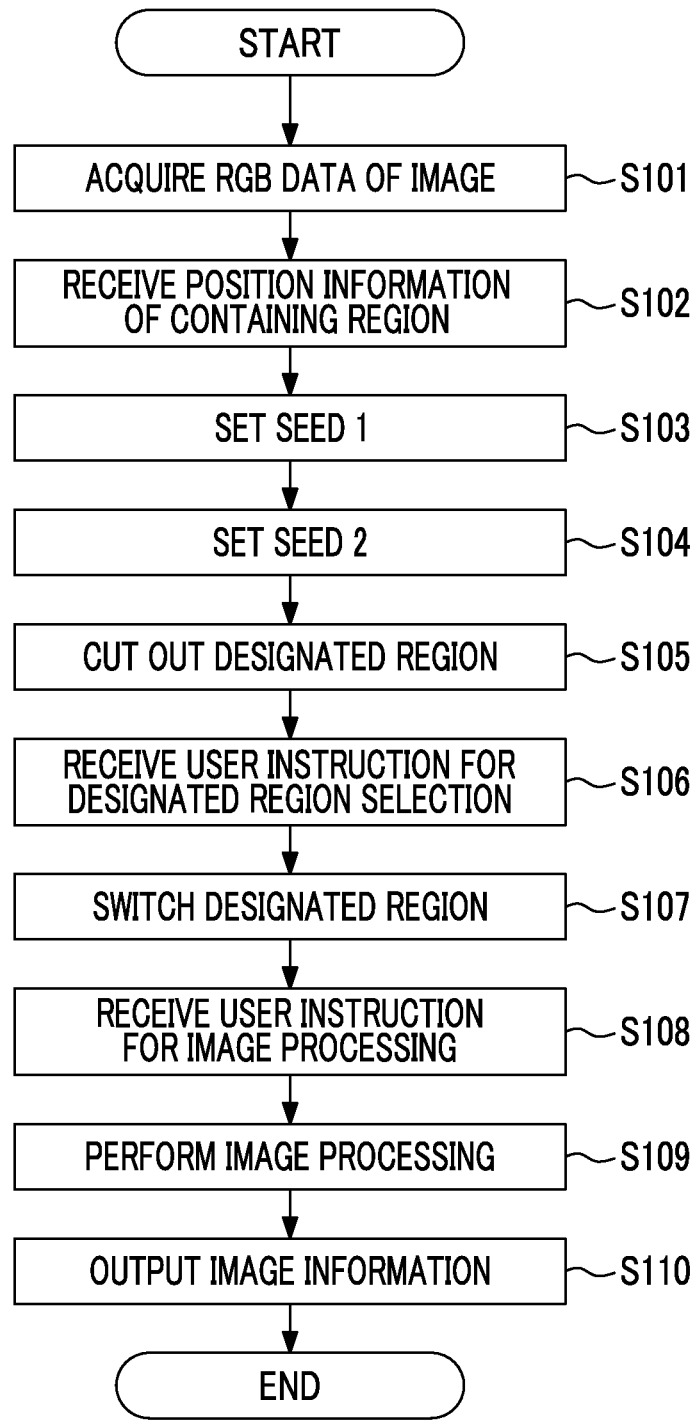
FIG. 13 is a flowchart illustrating an operation of an image processing apparatus in a first exemplary embodiment.

FIG. 13 is a flowchart illustrating an operation of the image processing apparatus 10 in the first exemplary embodiment.

Hereinafter, an operation of the image processing apparatus 10 of the first exemplary embodiment will be described using FIGS. 2 and 13.

First, the image information acquiring unit 11 acquires RGB data as image information of an image to be subjected to image processing (step 101). This RGB data is sent to the display device 20 and an image before image processing is performed is displayed.

Further, the user, for example, inputs a containing region that contains the designated region by drawing the trajectory using the input device 30 using the method illustrated in FIG. 3. The user instruction receiving unit 12 receives the position information of this containing region (step 102).

Next, the first representative position setting unit 13, for example, sets the seed 1 that is a first representative position based on the position information of the containing region using the method illustrated in FIG. 4 (step 103).

Further, the second representative position setting unit 14, for example, sets the seed 2 that is a second representative position based on the first representative position using the method illustrated in FIG. 4 or 6 (step 104).

Further, the region detection unit 15, for example, performs a process of cutting out the designated region from the seed 1 and the seed 2 using the method illustrated in FIG. 8 or 9 (step 105).

Next, the user inputs the selection of the designated region using the input device 30. For example, the user may input the selection through the manipulation illustrated in FIGS. 11A to 11C.

The user instruction receiving unit 12 receives this instruction to select the designated region from the user (step 106).

Also, the designated region is switched by the region switching unit 16 (step 107). For example, the designated region may be switched using, for example, the radio buttons 212a, 212b, and 212c illustrated in FIGS. 11A to 11C.

Further, the user inputs an instruction for image processing to be performed on the selected designated region using the input device 30. For example, the user may input the instruction using, for example, the slider 213b illustrated in FIG. 12.

The user instruction receiving unit 12 receives the instruction for image processing from the user (step 108).

Also, the image processing unit 17 performs the image processing of the selected designated region based on the instruction from the user (step 109).

Then, the image information output unit 18 outputs image information after the image processing is performed (step 110). This image information is RGB data, this RGB data is sent to the display device 20, and the image after image processing is displayed on the display screen 21.

Second Exemplary Embodiment

Next, a second exemplary embodiment of the image processing apparatus 10 will be described.

FIG. 14 is a block diagram illustrating an example of a functional configuration of the image processing apparatus 10 in a second exemplary embodiment of the present invention.

The image processing apparatus 10 of the present exemplary embodiment includes the image information acquiring unit 11, the user instruction receiving unit 12, a display switching unit 19, the first representative position setting unit 13, the second representative position setting unit 14, the region detection unit 15, the region switching unit 16, the image processing unit 17, and the image information output unit 18.

The image processing apparatus 10 of the second exemplary embodiment differs from the image processing apparatus 10 of the first exemplary embodiment illustrated in FIG. 2 in that the display switching unit 19 is included. Further, operations of other functional units are substantially the same as those in the first exemplary embodiment. Accordingly, the display switching unit 19 will be described herein.

The display switching unit 19 performs switching to determine whether a centerline of a trajectory K is to be displayed on an image G.

Figure 15A:
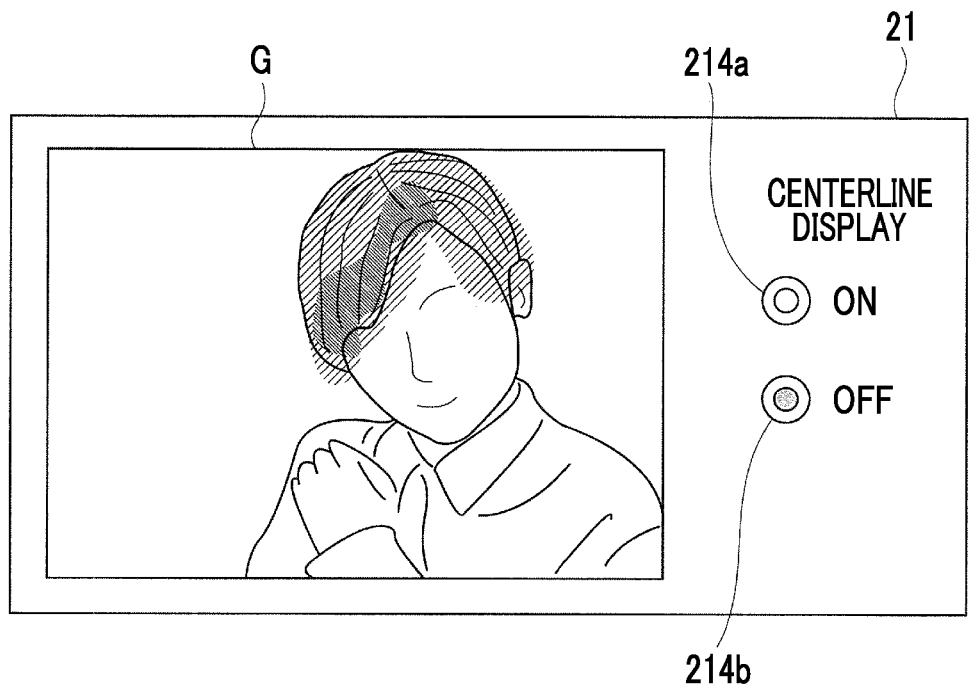
FIGS. 15A and 15B illustrate examples of a screen displayed on a display screen of a display device so as to determine whether a centerline of a trajectory is to be displayed.
Figure 15B:
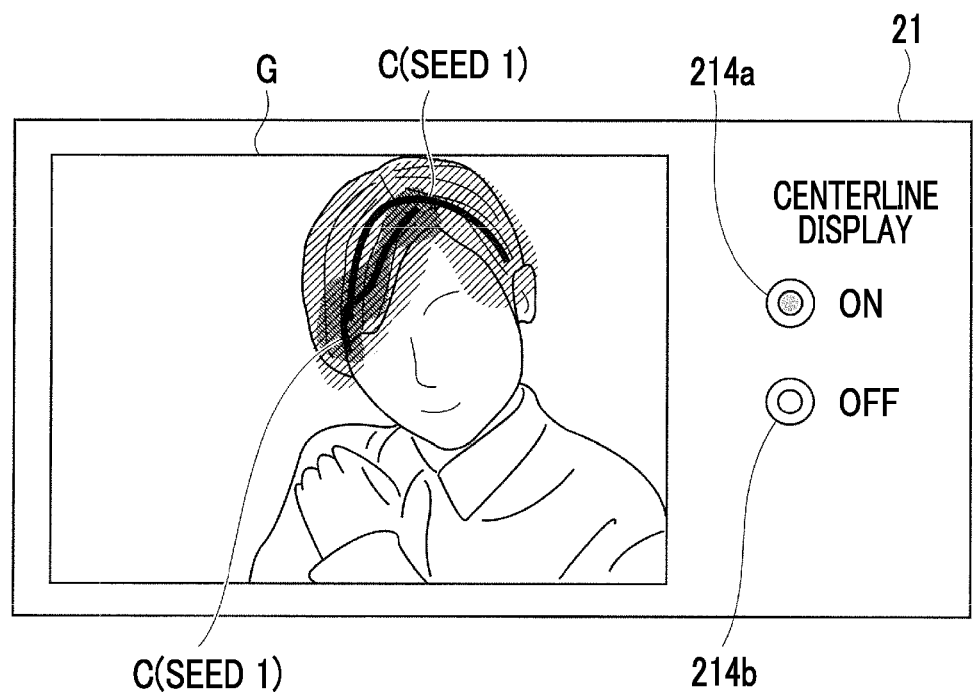

FIGS. 15A and 15B illustrate examples of a screen displayed on the display screen 21 of the display device 20 so as to determine whether the centerline of the trajectory is to be displayed.

In this example, an image G in which the trajectory has been drawn is displayed on the left side of the display screen 21, and radio buttons 214a and 214b for selecting "ON" or "OFF" of display of the centerline of the trajectory are displayed on the right side of the display screen 21.

Also, when the user selects the radio button 214a using the input device 30, the display of the centerline of the trajectory becomes "ON," and when the user selects the radio button 214b, the display of the centerline of the trajectory becomes "OFF."

In this case, FIG. 15A illustrates a case in which the radio button 214b is selected. In this case, since the display of the centerline of the trajectory is "OFF," the centerline of the trajectory is not displayed and the same image G as that illustrated in FIG. 3 is displayed.

On the other hand, FIG. 15B illustrates a case in which the radio button 214a is selected. In this case, since the display of the centerline of the trajectory is "ON," the display of the centerline C (seed 1) of the trajectory is performed, and an image G on which the centerline C (seed 1) has been drawn is displayed, similar to the image illustrated in FIG. 5. The display of this trajectory may be realized using a method of mounting a thin brush tool among brush tools used in the image processing software or the like for performing the image processing.

FIG. 16 is a flowchart illustrating an operation of the image processing apparatus 10 in the second exemplary embodiment.

Hereinafter, an operation of the image processing apparatus 10 of the second exemplary embodiment will be described using FIGS. 14 and 16.

Since steps 201 to 202 in FIG. 16 are the same as steps 101 to 102 of FIG. 13, description will be omitted.

Then, the user inputs an instruction regarding whether display of the centerline of the trajectory K is to be performed using the input device 30. For example, the user may input the instruction using the radio buttons 214a and 214b illustrated in FIGS. 15A and 15B.

Also, the user instruction receiving unit 12 receives the instruction of the centerline display from the user (step 203).

Further, the display switching unit 19 performs switching of the display of the centerline of the trajectory K according to the instruction from the user (step 204).

Further, steps 205 to 212 are the same as steps 103 to 110 of FIG. 13.

Third Exemplary Embodiment

Next, a third exemplary embodiment of the image processing apparatus 10 will be described.

In the first and second exemplary embodiments described above, the seed 1 that is the first representative position is the centerline of the locus, but the present invention is not limited thereto.

In the third exemplary embodiment, the first representative position setting unit 13 obtains the seed 1 using the following method.

Figure 17A:
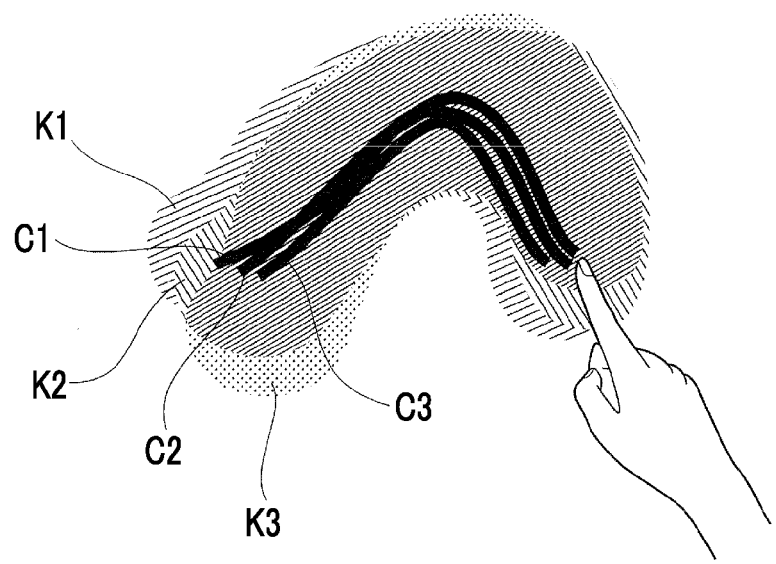
FIGS. 17A to 17C are diagrams illustrating a method of obtaining the seed 1 in a third exemplary embodiment.
Figure 17B:
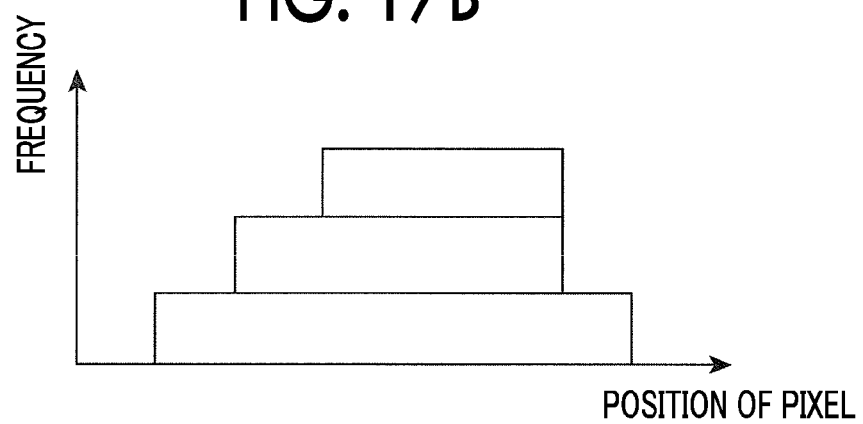
Figure 17C:
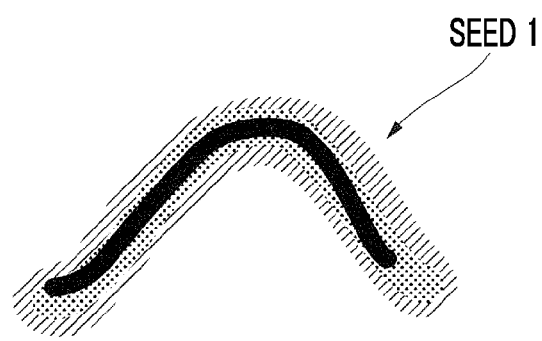

FIGS. 17A to 17C are diagrams illustrating a method of obtaining the seed 1 in the third exemplary embodiment.

In FIG. 17A, a case in which the user draws trajectories on an image G three times is illustrated. In FIG. 17A, the three trajectories are illustrated as the trajectory K1, the trajectory K2, and a trajectory K3. Further, centerlines of the trajectory K1, the trajectory K2, and the trajectory K3 are illustrated as a centerline C1, a centerline C2, and a centerline C3, respectively.

In this case, a relationship between the position of the pixel and a degree of overlap of the three centerlines (frequency) is obtained. This frequency indicates a degree of passage of the centerlines on the image G. That is, the frequency is 0 for a pixel in which all of the three centerlines are not located. Further, the frequency is 1 for a pixel in which only one of three centerlines are located. Similarly, the frequency is 2 for a pixel in which two of three centerlines are located, and the frequency is 3 for a pixel in which all of the three centerlines are located. That is, the frequency has an integer value from 0 to 3.

FIG. 17B is a diagram conceptually illustrating a relationship between the position of a pixel and the frequency.

In FIG. 17B, a horizontal axis indicates the position of the pixel, and a vertical axis indicates the frequency. Further, the horizontal axis is indicated one-dimensionally for convenience, but is expressed two-dimensionally since the position is a position on a two-dimensional image in practice.

Also, a position of this pixel is (x, y), a frequency of the position of the pixel is h(x, y), and a normalized frequency $h_{norm}(x, y)$ is obtained using Expression 1 below.

$$h_{norm}(x, y) = \frac{h(x, y)}{\max h(x, y)} \quad \text{[Expression 1]}$$

In this case, a maximum value of the normalized frequency $h_{norm}(x, y)$ becomes 1, and normalization is achieved.

Further, since the pixel value is usually represented by an integer value (gradation value) from 0 to 255, the normalized frequency $h_{norm}(x, y)$ is multiplied by 255 to be treated similarly to this pixel value. Further, a calculated value is treated as the seed 1.

FIG. 17C is a conceptual diagram illustrating the seed 1 calculated using the above method.

The seed 1 is determined according to the position of the pixel and has any one integer value among 0 to 255. In the case of FIG. 17C, since the frequency has four steps from 0 to 3, the seed 1 has any one value of 0, 85, 170, and 255. Thus, there is no problem in a process of performing cutting-out of the designated region even when the seed 1 is not a constant value.

Further, in Expression 1 above, a threshold parameter θ (0<θ<1) may be prepared to convert the normalized frequency $h_{norm}(x, y)$ into two values of 0 and 1 as in Expression 2 below.

$$h_{norm}(x,y) < \theta \rightarrow h_{norm}(x,y) = 0$$

$$\theta \leq h_{norm}(x,y) \rightarrow h_{norm}(x,y) = 1 \quad \text{[Expression 2]}$$

Further, in the second representative position setting unit 14, the position of the pixel in which the frequency defined by the degree of overlap of the trajectories is 0 is set to the seed 2 that is the second representative position. That is, a place at which the trajectory K1, the trajectory K2, and the trajectory K3 illustrated in FIGS. 17A to 17C are not all drawn is set to the seed 2.

Figure 18:
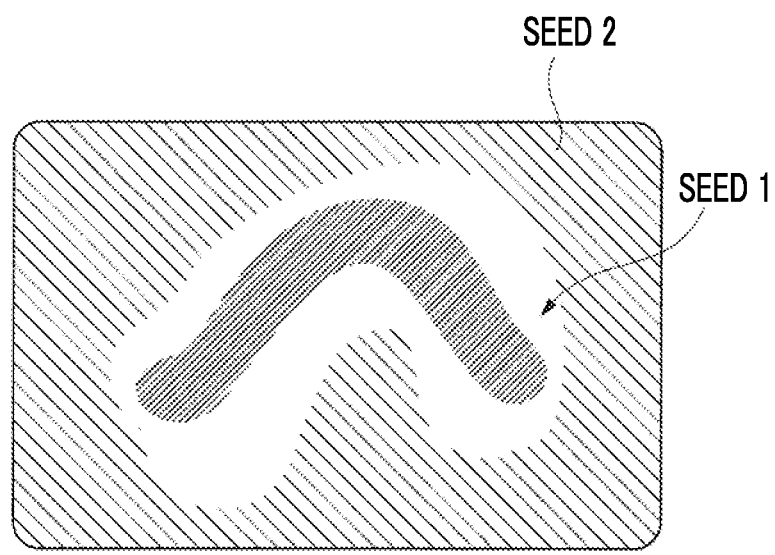
FIG. 18 is a diagram illustrating a case in which the seed 1 is set using the method illustrated in FIGS. 17A to 17C and a position of a pixel in which a frequency becomes 0 is set as the seed 2.

FIG. 18 is a diagram illustrating a case in which the seed 1 is set using the method illustrated in FIGS. 17A to 17C and the position of the pixel in which the frequency becomes 0 is set as the seed 2.

In this case, the seed 1 is defined as degree of overlap of the centerlines, and the seed 2 is set as all positions in which the trajectories K1, K2, and K3 of FIG. 17A are not drawn.

Fourth Exemplary Embodiment

Next, a fourth exemplary embodiment of the image processing apparatus 10 will be described.

In the third exemplary embodiment described above, the seed 1 is set using a concept of the frequency, whereas in the fourth exemplary embodiment, the seed 2 is also set using a concept of the frequency, as in the seed 1.

In this exemplary embodiment, a frequency h(x, y) is defined using the degree of overlap of the trajectories. Also, the normalized frequency $h_{norm}(x, y)$ is obtained using Expression 1, and the normalized frequency $h_{norm}(x, y)$ is converted into two values 0 and 1 using Expression 2. Also, a position of the pixel in which this value becomes 1 is the seed 1, and a position of the pixel in which this value becomes 0 is the seed 2.

Figure 19:
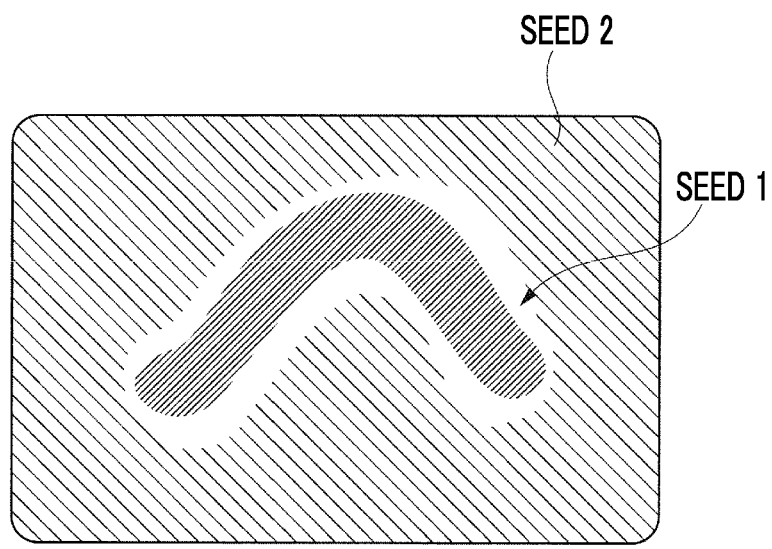
FIG. 19 is a diagram illustrating a case in which the seed 1 and the seed 2 are set using the method according to a fourth exemplary embodiment.

FIG. 19 is a diagram illustrating a case in which the seed 1 and the seed 2 are set using the method according to the fourth exemplary embodiment.

In this case, the seed 1 is the same as in the third exemplary embodiment illustrated in FIG. 18. On the other hand, the seed 2 in the third exemplary embodiment is set as all positions in which the trajectories K1, K2, and K3 are not drawn, whereas the seed 2 in the present exemplary embodiment is set according to the frequency. Therefore, the seed 2 extends up to portions in which trajectories K1, K2, and K3 are drawn, and a range of the seed 2 is closer to the seed 1, as illustrated in FIG. 19. That is, a region between the seed 1 and the seed 2 (a region illustrated as a blank portion between the seed 1 and the seed 2 in FIGS. 18 and 19) in FIG. 19 is narrower than that in FIG. 18.

The example of a functional configuration of the image processing apparatus in the first exemplary embodiment illustrated in FIG. 2 or the second exemplary embodiment illustrated in FIG. 14 is directly applicable as an example of a functional configuration of the image processing apparatus 10 in the third and fourth exemplary embodiments.

Further, the operation of the image processing apparatus in the first exemplary embodiment illustrated in FIG. 13 or the second exemplary embodiment illustrated in FIG. 16 is directly applicable as an operation of the image processing apparatus 10, except that the method of setting the seed 1 and the seed 2 is as in the case described above.

Fifth Exemplary Embodiment

Next, a fifth exemplary embodiment of the image processing apparatus 10 will be described.

In the fifth exemplary embodiment, supplemental position information that supplements the position of the designated region is further added to perform cutting-out of the designated region.

In this exemplary embodiment, the user instruction receiving unit 12 further acquires the supplemental position information that supplements the position of the designated region, in addition to the position information of the containing region input by a user to include the designated region.

Figure 20A:
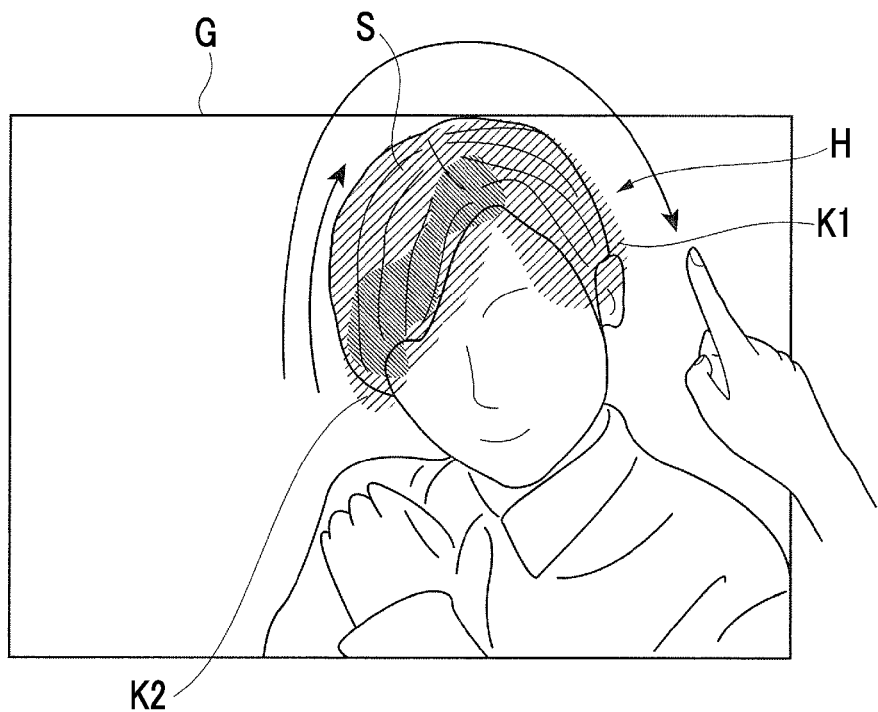
FIGS. 20A and 20B are diagrams illustrating supplemental position information in a fifth exemplary embodiment.
Figure 20B:
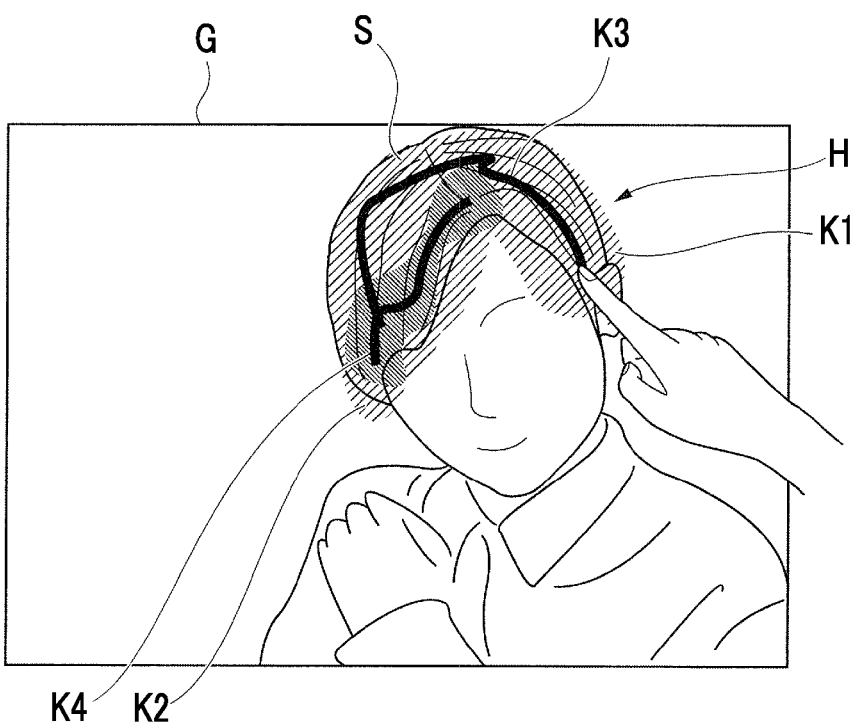

FIGS. 20A and 20B are diagrams illustrating the supplemental position information in the fifth exemplary embodiment.

FIG. 20A is the same diagram as FIG. 3, and illustrates a case in which a user inputs a containing region H containing a designated region S to the image G. The input of this containing region H is performed by a user drawing two trajectories, the trajectory K1 and the trajectory K2, on the image G, as illustrated in FIG. 3.

In this exemplary embodiment, the user draws a trajectory for supplementing the position of the designated region S from a state of FIG. 20A.

FIG. 20B illustrates a case in which a user draws trajectories for supplementing the position of the designated region S.

Here, these trajectories are shown as trajectories K3 and K4. These trajectories K3 and K4 are drawn as supplementary positions when the user wants to define the portion of the hair that is the designated region S more specifically, and are different from the centerlines of the trajectories K1 and K2.

That is, the trajectories K1 and K2 merely roughly designate the designated region S as a rough region. However, in this case, the user may want to clarify the region of the designated region S. In this exemplary embodiment, the designated region S is clarified by separately inputting the trajectories K3 and K4. Also, position information of these trajectories K3 and K4 is used as supplemental position information that supplements the position of the designated region S. For example, the position information of the trajectories K3 and K4 may be regarded and treated as the seed 1.

The trajectory as this supplemental information need not be drawn once and may be drawn in plural steps. In this exemplary embodiment, the user inputs the two trajectories K3 and K4. Further, it is preferable for these trajectories K3 and K4 to be displayed in an overlapping manner on the image G in the display screen 21.

This trajectory is easily input when the trajectory is drawn in a thin line rather than a thick line. This may be realized, for example, using a method of mounting a thin brush tool among brush tools used in image processing software or the like for performing image processing.

The region detection unit 15 detects the designated region S by using the supplemental position information that is the position information of the trajectories K3 and K4, in addition to the seed 1 that is the first representative position and the seed 2 that is the second representative position.

Sixth Exemplary Embodiment

Next, a sixth exemplary embodiment of the image processing apparatus 10 will be described.

In the sixth exemplary embodiment, supplemental position information that supplements the position of the region-outside-designated-region is further added to perform cutting-out of the designated region.

In this exemplary embodiment, the user instruction receiving unit 12 acquires supplemental position information that supplements the position of the region-outside-designated-region, in addition to the supplemental position information that supplements the position of the designated region described in the fifth exemplary embodiment.

Figure 21A:
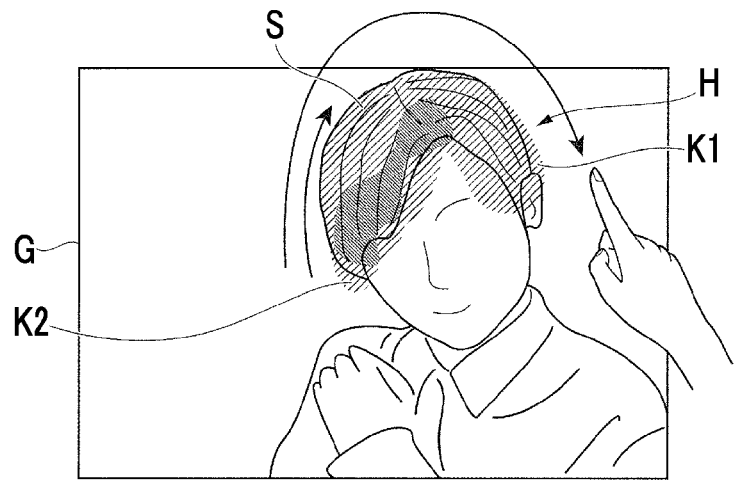
FIGS. 21A to 21C are diagrams illustrating supplemental position information in a sixth exemplary embodiment.
Figure 21B:
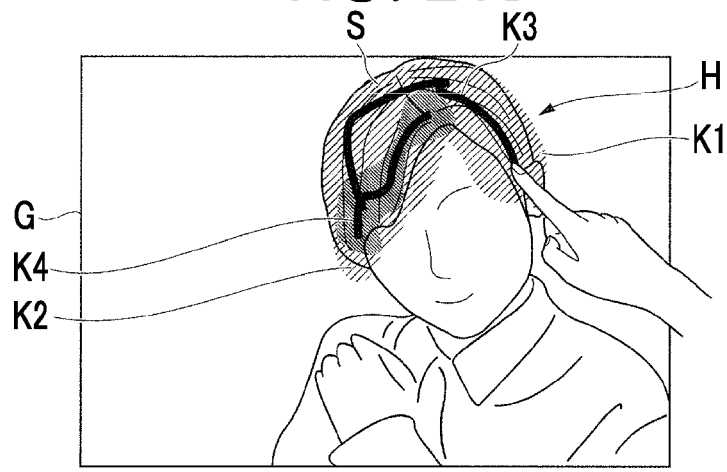
Figure 21C:
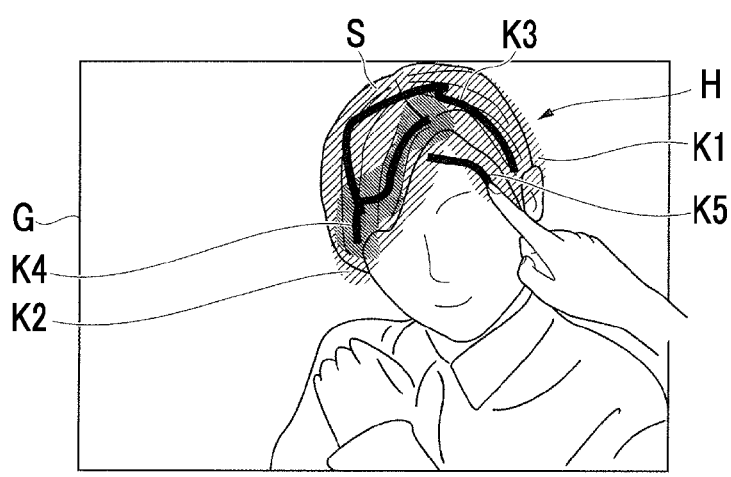

FIGS. 21A to 21C are diagrams illustrating supplemental position information in the sixth exemplary embodiment.

FIGS. 21A and 21B are the same diagram as FIGS. 20A and 20B, and illustrate that the user inputs the containing region H containing the designated region S to the image G and inputs trajectories K3 and K4 as trajectories for supplementing the position of the designated region S. Also, the position information of the trajectories K3 and K4 is used as supplemental position information that supplements the position of the designated region S as described above.

In this exemplary embodiment, the user further draws a trajectory for supplementing the position of the region-outside-designated-region from a state of FIG. 21B.

FIG. 21C illustrates a case in which the user draws the trajectory for supplementing the position of the region-outside-designated-region.

Here, this trajectory is illustrated as a trajectory K5. This trajectory K5 is drawn as a supplementary position when the user wants to more specifically define a portion other than the hair, which is the region-outside-designated-region. In this exemplary embodiment, the trajectory K5 is drawn at a forehead of the person.

When the user wants to clarify the region-outside-designated-region, the trajectory K5 realizes this through separate input of the trajectory K5. Also, position information of this trajectory K5 may be used as supplemental position information that supplements the position of the region-outside-designated-region. For example, the position information of the trajectory K5 may be regarded and treated as the seed 2.

The trajectory as this supplemental information need not be drawn once and may be drawn in plural steps. However, in FIG. 21C, the user inputs only one trajectory K5. Further, it is preferable for this trajectory K5 to be displayed in an overlapping manner on the image G in the display screen 21, as in the fifth exemplary embodiment. Also, this case may also be realized using a method of mounting a thin brush tool among brush tools used in image processing software or the like for performing image processing. Further, to switch between the supplemental position information that supplements the position of the designated region and the supplemental position information that supplements the position of the region-outside-designated-region, for example, radio buttons for switching between the pieces of information are displayed on the display screen 21, as illustrated in FIGS. 11A to 11C or FIGS. 15A and 15B, and the switching may be performed by the user manipulating the radio buttons.

The region detection unit 15 detects the designated region S using the supplemental position information that is position information of trajectories K3, K4 and K5, in addition to the seed 1 that is the first representative position and the seed 2 that is the second representative position.

In the example described above, while the user draws trajectories for both of the designated region and the region-outside-designated-region, and the region detection unit 15 detects the designated region S using the supplemental position information of both of the regions, the present invention is not limited thereto. That is, the user may draw the trajectory for only the region-outside-designated-region, and the region detection unit 15 may detect the designated region S using the supplemental position information of the region-outside-designated-region.

Figure 22:
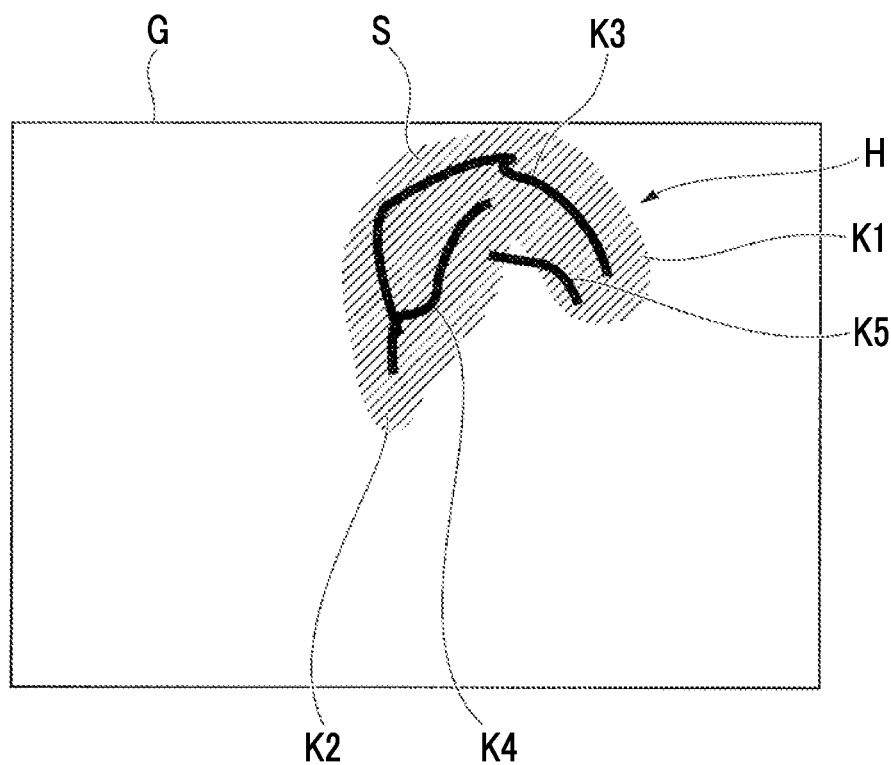
FIG. 22 is a diagram illustrating a case in which a containing region and supplemental position information are extracted from an image illustrated in FIG. 21C.

FIG. 22 is a diagram illustrating a case in which the containing region H and supplemental position information are extracted from the image G illustrated in FIG. 21C.

As illustrated in FIG. 22, a portion of a trajectory K5 is contained in the containing region H, but is clarified to be the region-outside-designated-region.

The example of the functional configuration of the image processing apparatus in the first exemplary embodiment illustrated in FIG. 2 or the second exemplary embodiment illustrated in FIG. 14 is directly applicable as an example of a functional configuration of the image processing apparatus 10 in the fifth and sixth exemplary embodiments.

Meanwhile, an operation of the image processing apparatus 10 is as follows.

Figure 23:
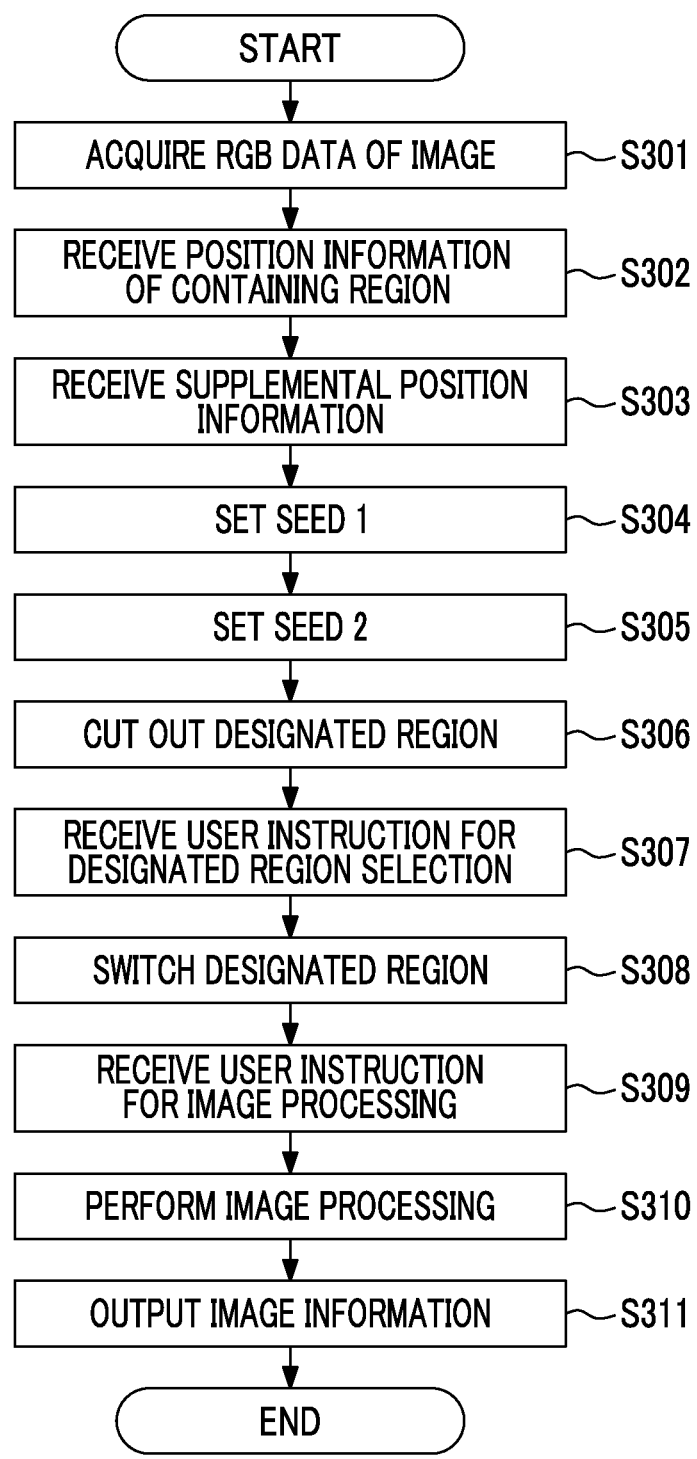
FIG. 23 is a flowchart illustrating an operation of an image processing apparatus in the fifth exemplary embodiment and the sixth exemplary embodiment.

FIG. 23 is a flowchart illustrating an operation of the image processing apparatus 10 in the fifth and sixth exemplary embodiments.

Hereinafter, an operation of the image processing apparatus 10 of the fifth and sixth exemplary embodiments will be described using FIGS. 2 and 23.

Since steps 301 to 302 in FIG. 23 are the same as steps 101 to 102 of FIG. 13, description will be omitted.

Next, the user inputs a supplemental position by drawing trajectories for supplementing the position of the designated region or the region-outside-designated-region. These are illustrated as the trajectories K3, K4, and K5 illustrated in FIGS. 20A to 22.

The user instruction receiving unit 12 receives the position information of the trajectory from the user as the supplemental position information (step 303).

Then, the first representative position setting unit 13 sets the seed 1 that is the first representative position (step 304). In this case, the supplemental position information for the designated region may be treated as the seed 1.

Further, the second representative position setting unit 14 sets the seed 2 that is the second representative position (step 305). In this case, the supplemental position information for the region-outside-designated-region may be treated as the seed 2.

Also, the region detection unit 15 performs a process of cutting out the designated region from the seed 1 and the seed 2 (step 306).

Further, steps 307 to 311 are the same as steps 106 to 110 of FIG. 13.

According to the first to sixth exemplary embodiments described above in detail, the user performs a task of inputting the containing region that contains the designated region. Also, the image processing apparatus 10 performs cutting-out of the designated region based on the position information of the containing region.

In this case, it is not necessary to input both of the designated region and the region-outside-designated-region, and only the containing region that contains the designated region may be input. Further, for the user, a task of inputting the containing region, so to speak, becomes a task of roughly filling the designated region, peace of mind is given to the user, and a psychological burden is reduced. Therefore, a burden of the inputting task on the user is reduced, and user convenience is improved. Further, the process of cutting the designated region is easily speeded up.

Further, according to the second exemplary embodiment, the centerline is made visible by setting the display of the centerline of the trajectory to "ON." In this case, the user often feels that it is easier to use. Further, since the centerline remains as the seed 1 that is the first representative position and is used as a representative position of the designated region, this helps to confirm whether this centerline is outside the designated region. Thus, convenience for the user is further improved.

Further, according to the third and fourth exemplary embodiments, when the user draws the locus, a case in which the user draws the trajectory plural times is a case in which the user wants to enhance cutting-out of the designated region in terms of psychology of the user, and a region in which the centerline or the trajectory overlaps is considered to be a region desired to be cut out as the designated region without mistake. Accordingly, the seed 1 intended by the user may be considered to be able to be extracted by obtaining the seed 1 that is the first representative position based on the frequency. Thus, precision of cutting-out of the designated region is further improved.

Further, according to the fifth and sixth exemplary embodiments, the supplemental position information is used, and thus, the range of the designated region or the region-outside-designated-region can be further clarified, and precision of cutting-out of the designated region is further improved.

Further, the process performed in the region detection unit 15 described above may be understood as an image processing method characterized by acquiring image information of the image G, acquiring position information of the containing region H input by the user to include the designated region S that is a specific image region in the image G, setting the first representative position (seed 1) that is the representative position of the designated region S and the second representative position (seed 2) that is the representative position of the region-outside-designated-region, which is a region outside the designated region S, based on the position information of the containing region H, and detecting the designated region S from the first representative position (seed 1) and the second representative position (seed 2).

Examples of Hardware Example of Configuration of Image Processing Apparatus

Next, a hardware configuration of the image processing apparatus 10 will be described.

Figure 24:
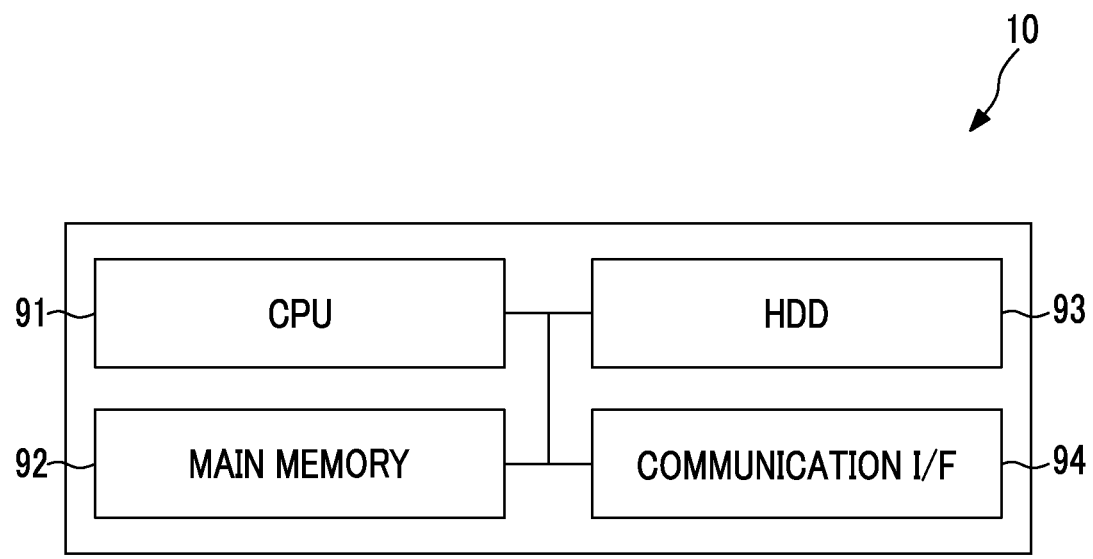
FIG. 24 is a diagram illustrating a hardware configuration of the image processing apparatus.

FIG. 24 is a diagram illustrating a hardware configuration of the image processing apparatus 10.

The image processing apparatus 10 is realized by a personal computer, as described above. Also, as illustrated, the image processing apparatus 10 includes a central processing unit (CPU) 91 that is a calculation unit, and a main memory 92 and a hard disk drive (HDD) 93 that constitute a storage unit. Here, the CPU 91 executes various programs, such as an operating system (OS) or application software. Further, the main memory 92 is a storage region in which various programs or data used for execution of the programs is stored, and the HDD 93 is a storage region in which data input to various programs or data output from the various programs is stored.

Further, the image processing apparatus 10 includes a communication interface (hereinafter referred to as a "communication I/F") 94 for performing communication with the outside.

Description of Program

Here, a process that is performed by the image processing apparatus 10 in the present exemplary embodiment described above is prepared as, for example, a program such as application software.

Thus, in the present exemplary embodiment, the process that is performed by the image processing apparatus 10 may be understood as a program characterized by causing a computer to realize an image information acquiring function of acquiring the image information of the image G, a position information acquisition function of acquiring the position information of the containing region H input by the user to contain the designated region S that is a specific image region in the image G, a first representative position setting function of setting the first representative position (seed 1) that is a representative position of the designated region S based on the position information of the containing region H, a second representative position setting function of setting the second representative position (seed 2) that is a representative position of the region-outside-designated-region, which is a region outside the designated region S, and a region detection function of detecting the designated region S from the first representative position (seed 1) and the second representative position (seed 2).

Further, the program for realizing the present exemplary embodiment may not only be provided by a communication unit, but also stored and provided in a recording medium, such as a CD-ROM.

While the present exemplary embodiments have been described above, a technical scope of the present invention is not limited to the scope described in the exemplary embodiments. It is apparent from the description of the claims that various modifications or improvements may be made to the above exemplary embodiments within the technical scope of the present invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
   a processor configured to:
      acquire image information of an image and displays the image on a display;
      receive input, from an electronic device used by a user, of position information of a containing region by receiving input of a plurality of overlapping trajectories on the displayed image, wherein each trajectory includes (1) at least a portion of a designated region that is a specific image region of pixels in the displayed image and (2) a peripheral portion of pixels protruding from the at least a portion of the designated region on the displayed image;
      set a first representative position that is a representative position of the designated region based on the position information of the containing region and according to a frequency of overlap of the plurality of overlapping trajectories;
      set a second representative position that is a representative position of a region-outside-designated-region that is a region outside the designated region; and
      detect the pixels of the designated region based on the first representative position and the second representative position by cutting out the designated region from the displayed image.

2. The image processing apparatus according to claim 1, wherein the containing region is input by the user drawing the plurality of trajectories on the displayed image, whereby each of the trajectories comprises a line extending from a point that the user's electronic device first makes contact with the display until a point where the user stops making contact with the display.

3. The image processing apparatus according to claim 1, wherein the containing region is input by the user drawing a first trajectory on the displayed image, and the processor sets a position of a centerline of the first trajectory as the first representative position.

4. The image processing apparatus according to claim 3, wherein the image processing apparatus further includes a display switching unit that switches to determine whether or not to display the centerline on the displayed image.

5. The image processing apparatus according to claim 1, wherein the processor sets the second representative position as a position of at least a portion outside the containing region.

6. The image processing apparatus according to claim 2, wherein the processor sets the second representative position as a position of at least a portion outside the containing region.

7. The image processing apparatus according to claim 3, wherein the processor sets the second representative position as a position of at least a portion outside the containing region.

8. The image processing apparatus according to claim 4, wherein the processor sets the second representative position as a position of at least a portion outside the containing region.

9. The image processing apparatus according to claim 1, wherein the processor further acquires supplemental position information that supplements at least one of positions of the designated region and the region-outside-designated-region, and
the processor detects the designated region using the supplemental position information, in addition to the first representative position and the second representative position.

10. The image processing apparatus according to claim 2, wherein the processor further acquires supplemental position information that supplements at least one of positions of the designated region and the region-outside-designated-region, and
the processor detects the designated region acquiring unit using the supplemental position information, in addition to the first representative position and the second representative position.

11. The image processing apparatus according to claim 3, wherein the position processor further acquires supplemental position information that supplements at least one of positions of the designated region and the region-outside-designated-region, and
the processor detects the designated region using the supplemental position information, in addition to the first representative position and the second representative position.

12. The image processing apparatus according to claim 4, wherein the processor further acquires supplemental position information that supplements at least one of positions of the designated region and the region-outside-designated-region, and
the processor detects the designated region using the supplemental position information, in addition to the first representative position and the second representative position.

13. The image processing apparatus according to claim 5, wherein the processor further acquires supplemental position information that supplements at least one of positions of the designated region and the region-outside-designated-region, and
the processor detects the designated region using the supplemental position information, in addition to the first representative position and the second representative position.

14. The image processing apparatus according to claim 6, wherein the processor further acquires supplemental position information that supplements at least one of positions of the designated region and the region-outside-designated-region, and
the processor detects the designated region using the supplemental position information, in addition to the first representative position and the second representative position.

15. The image processing apparatus according to claim 7, wherein the processor further acquires supplemental position information that supplements at least one of positions of the designated region and the region-outside-designated-region, and
the processor detects the designated region using the supplemental position information, in addition to the first representative position and the second representative position.

16. The image processing apparatus according to claim 8, wherein the processor further acquires supplemental position information that supplements at least one of positions of the designated region and the region-outside-designated-region, and
the processor detects the designated region using the supplemental position information, in addition to the first representative position and the second representative position.

17. An image processing method comprising:
acquiring image information of an image and displaying the image on a display;
acquiring input, from an electronic device used by a user, of position information of a containing region by receiving input of a plurality of overlapping trajectories on the displayed image, wherein each trajectory includes (1) at least a portion of a designated region that is a specific image region of pixels in the displayed image and (2) a peripheral portion of pixels protruding from the at least a portion of the designated region on the displayed image;
setting a first representative position that is a representative position of the designated region based on the position information of the containing region and according to a frequency of overlap of the plurality of overlapping trajectories;
setting a second representative position that is a representative position of a region-outside-designated-region that is a region outside the designated region; and
detecting the pixels of the designated region based on the first representative position and the second representative position by cutting out the designated region from the displayed image.

18. An image processing system comprising:
a display device that displays an image;
an image processing apparatus that performs image processing on image information of the image displayed on the display device; and
an input device used for a user to input an instruction for performing image processing on the image processing apparatus,
wherein the image processing apparatus includes:
a processor configured to:
receive input, from an electronic device used by a user, of position information of a containing region by receiving input of a plurality of overlapping trajectories on the displayed image, wherein each trajectory includes (1) at least a portion of a designated region that is a specific image region of pixels in the displayed image and (2) a peripheral portion of pixels protruding from the at least a portion of the designated region on the displayed image;

set a first representative position that is a representative position of the designated region based on the position information of the containing region and according to a frequency of overlap of the plurality of overlapping trajectories;

set a second representative position that is a representative position of a region-outside-designated-region that is a region outside the designated region; and detect the pixels of the designated region based on the first representative position and the second representative position by cutting out the designated region from the displayed image; and an image processing unit that performs image processing on the designated region.

* * * * *